(12) United States Patent
Son

(10) Patent No.: US 8,533,599 B2
(45) Date of Patent: Sep. 10, 2013

(54) MOBILE TERMINAL AND METHOD FOR CONTROLLING MUSIC PLAY THEREOF

(75) Inventor: Young-Seob Son, Seoul (KR)

(73) Assignee: LG Electronics Inc., Seoul (KR)

( * ) Notice: Subject to any disclaimer, the term of this patent is extended or adjusted under 35 U.S.C. 154(b) by 760 days.

(21) Appl. No.: 12/402,975

(22) Filed: Mar. 12, 2009

(65) Prior Publication Data

US 2010/0058253 A1 Mar. 4, 2010

(30) Foreign Application Priority Data

Aug. 29, 2008 (KR) ........................ 10-2008-0085499

(51) Int. Cl.
*G06F 3/048* (2013.01)
(52) U.S. Cl.
USPC .......................... 715/727; 715/716; 715/863
(58) Field of Classification Search
USPC ........................................ 715/763, 839, 863
See application file for complete search history.

(56) References Cited

U.S. PATENT DOCUMENTS

| 7,941,739 B1* | 5/2011 | Mohammed et al. ......... 715/202 |
| 2006/0007190 A1* | 1/2006 | Pettiross et al. ............... 345/179 |
| 2006/0212478 A1* | 9/2006 | Plastina et al. ............. 707/104.1 |
| 2008/0249644 A1* | 10/2008 | Jehan ............................. 700/94 |
| 2008/0307309 A1* | 12/2008 | Marinkovich et al. ........ 715/723 |
| 2009/0158222 A1* | 6/2009 | Kerr et al. ..................... 715/867 |
| 2009/0177966 A1* | 7/2009 | Chaudhri ...................... 715/716 |

* cited by examiner

*Primary Examiner* — Matt Kim
*Assistant Examiner* — William Trapanese
(74) *Attorney, Agent, or Firm* — Lee, Hong, Degerman, Kang & Waimey

(57) ABSTRACT

A mobile terminal is provided including a display unit, a sensing unit, and a controller. The display unit is configured as a touch screen for displaying album art of a song currently being played. The sensing unit is for sensing a touch applied to the touch screen. The controller is for controlling play of the song based on a touch sensed at a certain region of the album art displayed on the display unit.

12 Claims, 20 Drawing Sheets

(a) (b) (c)

(a) (b)

MOBILE TERMINAL AND METHOD FOR CONTROLLING MUSIC PLAY THEREOF

CROSS-REFERENCE TO RELATED APPLICATIONS

Pursuant to 35 U.S.C. §119(a), this application claims the benefit of earlier filing date and right of priority to Korean Application No. 10-2008-0085499, filed on Aug. 29, 2008, the contents of which is incorporated by reference herein in its entirety.

FIELD OF THE INVENTION

The present invention relates to a mobile terminal for controlling music play by using album art.

DESCRIPTION OF THE RELATED ART

As functions of terminals such as a personal computer, a notebook computer, and a mobile phone are diversified, the terminals are implemented as multimedia players having multiple functions such as capturing images and video, reproducing video files, playing music files, playing games, and receiving broadcasts.

The terminals may be grouped into mobile terminals and stationary terminals according to whether the terminals are movable. In addition, mobile terminals may be grouped into handheld terminals and vehicle mount terminals according to whether users can carry the terminal around on their person.

In order to support and increase the functions of terminals, modification of structural parts and/or software parts of the terminals may be taken into consideration.

SUMMARY OF THE INVENTION

In an exemplary embodiment of the present invention, a mobile terminal is provided including a display unit, a sensing unit, and a controller. The display unit is configured as a touch screen for displaying album art of a song currently being played. The sensing unit is for sensing a touch applied to the touch screen. The controller is for controlling play of the song based on a touch sensed at a certain region of the album art displayed on the display unit.

In one embodiment, the controller moves the album art on the display unit according to a lapse of song play time.

In one embodiment, the controller moves the album art on the display unit according to a touch and drag input.

In one embodiment, the controller changes a play position of the song according to the movement of the album art.

In one embodiment, the controller moves a progress bar on the display unit according to the movement of the album art.

In one embodiment, the controller plays the song, pauses the song, searches for songs, plays a previous song, plays a next song, rewinds the song, or fast-forwards the song.

In one embodiment, the controller realigns and displays album art corresponding to at least a previous song or a next song based on the song currently being played and a playing order.

In one embodiment, the controller realigns and displays album art on the display unit according to a change in a play order.

In an exemplary embodiment of the present invention, a method for controlling music play of a mobile terminal is provided. The method includes executing a player to play a song; displaying album art of the song currently being played by the player; detecting a touch input applied on the displayed album art; and controlling play of the song based on the detected touch input on the album art.

In one embodiment, displaying the album art includes displaying the album art in a display unit and moving the album art across the display unit according to a lapse of a play time of the song currently being played.

In one embodiment, when controlling play of the song, a control command corresponding to a region on the album art where the touch input has been detected is performed.

In one embodiment, the control command includes at least a command to play a song, pause a song, search for songs, move a previous song, move a next song, rewind the song, or fast-forward the song.

In an exemplary embodiment of the present invention, a method for controlling music play of a mobile terminal is provided. The method includes calculating a song play lapse time when a song is played; moving album art associated with the song based on the song play lapse time; and moving a progress bar based on the movement of the album art.

In one embodiment, the method further includes changing a song play position according to manipulation of the album art or the progress bar.

DETAILED DESCRIPTION

The mobile terminal according to exemplary embodiments of the present invention will now be described with reference to the accompanying drawings. In the following description, usage of suffixes such as 'module', 'part' or 'unit' used for referring to elements is used merely to facilitate explanation of the present invention, without having any significant meaning by itself.

The mobile terminal described in the present invention may include mobile phones, smart phones, notebook computers, digital broadcast receivers, PDAs (personal digital assistants), PMPs (portable multimedia players), navigation devices, or other terminals that are mobile. It would be understood by a person in the art that the configuration according to the embodiments of the present invention can be also applicable to the fixed types of terminals such as digital TVs or desktop computers, except for any elements especially configured for a mobile purpose.

Figure 1:
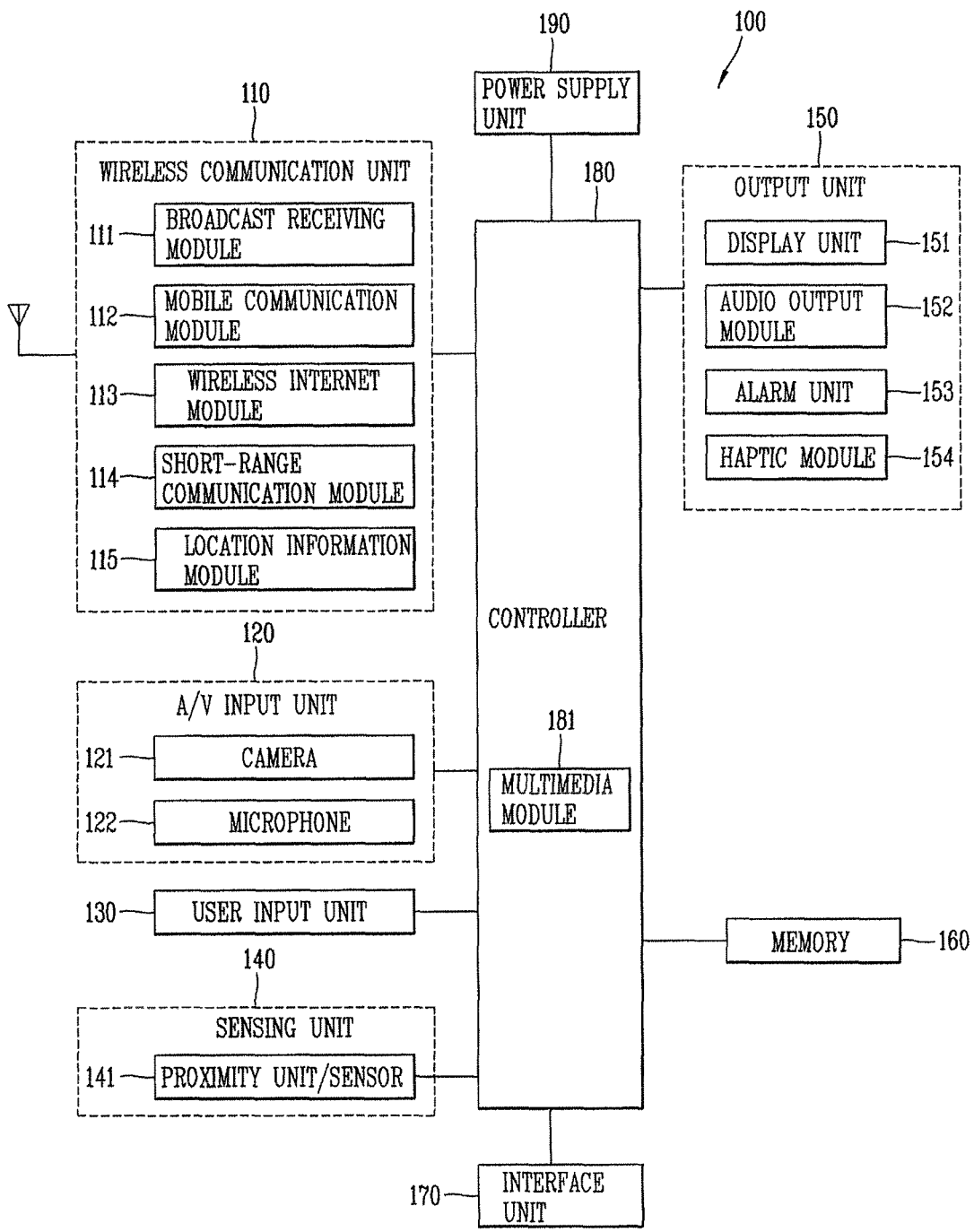
FIG. 1 is a schematic block diagram of a mobile terminal according to one embodiment of the present invention.

FIG. 1 is a block diagram of a mobile terminal according to an embodiment of the present invention. The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190. Greater or fewer components may alternatively be implemented.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, or a data broadcast signal. The broadcast signal may include a broadcast signal combined with a TV or radio broadcast signal.

The broadcast associated information may be information associated with a broadcast channel, a broadcast program or a broadcast service provider. The broadcast associated information may be provided via a mobile communication network and may be received by the mobile communication module 112.

The broadcast associated information may exist in various forms. For example, it may exist in the form of an electronic program guide (EPG) of digital multimedia broadcasting (DMB) or an electronic service guide (ESG) of digital video broadcast-handheld (DVB-H).

The broadcast receiving module 111 may be configured to receive signals broadcast by various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), or integrated services digital broadcast-terrestrial (ISDB-T). The broadcast receiving module 111 may be configured to be suitable for every broadcast system that provides a broadcast signal as well as the above-mentioned digital broadcast systems. Broadcast signals and/or broadcast-associated information received via the broadcast receiving module 111 may be stored in the memory 160.

The mobile communication module 112 transmits and/or receives radio signals to and/or from at least one of a base station (e.g., access point, Node B), an external terminal (e.g., other user devices) and a server (or other network entities). Such radio signals may include a voice call signal, a video call signal, or various types of data according to text and/or multimedia message transmission and/or reception.

The wireless Internet module 113 supports wireless Internet access for the mobile terminal. The wireless Internet module 113 may be internally or externally coupled to the mobile terminal 100. The wireless Internet access technique implemented may include a WLAN (Wireless LAN) (Wi-Fi), Wibro (Wireless broadband), Wimax (World Interoperability for Microwave Access), or HSDPA (High Speed Downlink Packet Access).

The short-range communication module 114 is a module for supporting short range communications. Some examples of short-range communication technology include Bluetooth™, Radio Frequency Identification (RFID), Infrared Data Association (IrDA), Ultra-WideBand (UWB), and ZigBee™.

The location information module 115 is a module for checking or acquiring a location (or position) of the mobile terminal. A typical example of the location information module 115 is a global positioning system (GPS) module.

According to the current technology, the GPS module 115 may calculate information regarding the distance from three or more satellites from one point and information about time during which the distance information was measured, and then calculate three-dimensional location information according to latitude, longitude, and altitude with respect to one point at one time. In addition, a method of calculating distance and time information by using three satellites and performing error correction on the calculated location and time information by using another satellite may be used. In particular, the GPS module 115 may continuously calculate a current location in real time and calculate speed information.

With reference to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile terminal 100.

The microphone 122 may receive sounds (audible data) in a phone call mode, a recording mode, and a voice recognition mode, and can process such sounds into audio data. The processed audio (voice) data may be converted for output into a format transmittable to a mobile communication base station (or other network entity) via the mobile communication module 112 if in the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal 100. The user input unit 130 may include a keypad, a dome switch, a touch pad (e.g., a touch sensitive member that detects changes in resistance, pressure, or capacitance due to being contacted), a jog wheel, or a jog switch.

The sensing unit 140 detects a current status (or state) of the mobile terminal such as an opened or closed state of the mobile terminal, a location of the mobile terminal, the presence or absence of user contact with the mobile terminal (i.e., touch inputs), the orientation of the mobile terminal 100, an acceleration and deceleration movement, and a direction of the mobile terminal 100. The sensing unit 140 generates commands or signals for controlling the operation of the mobile terminal 100.

For example, when the mobile terminal 100 is implemented as a slide type mobile phone, the sensing unit 140 may sense whether the slide phone is open or closed. In addition, the sensing unit 140 can detect whether the power supply unit 190 supplies power or whether the interface unit 170 is coupled with an external device. The sensing unit 140 may include a proximity unit/sensor 141.

The output unit 150 is configured to generate outputs in a visual, audible, and/or tactile manner. The output unit 150 may include the display unit 151, an audio output module 152, an alarm unit 153, and a haptic module 154.

The display unit 151 may display information processed in the mobile terminal 100. For example, when the mobile terminal 100 is in a phone call mode, the display unit 151 may display a user interface (UI) or a graphic user interface (GUI) associated with a call or other communication. When the mobile terminal 100 is in a video call mode or image capturing mode, the display unit 151 may display a captured image and/or received image, a UI, or a GUI.

The display unit 151 may include at least one of a Liquid Crystal Display (LCD), a Thin Film Transistor-LCD (TFT-LCD), an Organic Light Emitting Diode (OLED) display, a flexible display, or a three-dimensional (3D) display. Some of the displays may be transparent displays, which are configured to be transparent or light-transmissive to allow viewing of the exterior of the display. A typical transparent display may be, for example, a Transparent Organic Light Emitting Diode (TOLED) display. A rear structure of the display unit 151 may also have such a light-transmissive configuration. With such a structure, the user may view objects located at the rear side of the display unit 151.

The mobile terminal 100 may include two or more display units 151 (or other display means) according to its particular desired embodiment. For example, the mobile terminal 100 may include a plurality of display units 151 which are disposed, separately or integrally, on one surface or disposed on different surfaces.

When the display unit 151 and a sensor for detecting a touch operation are overlaid in a layered manner (referred to as a 'touch sensor', hereinafter), the display unit 151 may be used as an input device as well as an output device. The touch sensor may be formed as a touch film, a touch sheet, or a touch pad.

The touch sensor may be configured to convert a change in the pressure applied to a particular portion of the display unit 151 or a change in capacitance generated at a particular portion of the display unit into an electrical input signal. The touch sensor may be configured to detect the pressure of a touch as well as a touched position or an area.

When there is a touch input with respect to the touch sensor, a corresponding signal or signals are sent to a touch controller. The touch controller processes the signal and then transmits corresponding data to the controller 180. Accordingly, the controller 180 can recognize which portion of the display unit 151 has been touched.

With reference to FIG. 1, a proximity unit/sensor 141 may be located at an internal region of the mobile terminal 100 covered by the touch screen or near the touch screen. The proximity unit/sensor 141 is a sensor for detecting the presence or absence of an object relative to a certain detection surface of an object that exists nearby by using the force of electromagnetism or infrared rays without a physical contact. Thus, the proximity unit/sensor 141 has a considerably longer life span compared with a contact type sensor and therefore can be utilized for various additional purposes.

Examples of the proximity unit/sensor 141 include a transmission photo sensor, a direct reflection photo sensor, a mirror-reflection photo sensor, an RF oscillation proximity sensor, a capacitance proximity sensor, a magnetic proximity sensor, and an infrared proximity sensor.

If the touch screen is an electrostatic type touch sensor, the touch screen is configured to detect the approach of a pointer (stylus) based on a change in a field according to the approach of a pointer. As such, the touch sensor may be classified as a proximity sensor.

In the following description, for the sake of brevity, recognition of the pointer positioned to be close to the touch screen without actually being brought into contact with the touch screen will be called a 'proximity touch', while recognition of actual contacting of the pointer on the touch screen will be called a 'contact touch'. When the pointer is in the state of the proximity touch, it means that the pointer is positioned to correspond vertically to the touch screen.

The proximity sensor 141 detects a proximity touch and a proximity touch pattern such as a proximity touch distance, a proximity touch speed, a proximity touch time, a proximity touch position, and a proximity touch movement state. Information corresponding to the detected proximity touch operation and information corresponding to the proximity touch pattern may be output to the touch screen.

The audio output module 152 may output audio data received from the wireless communication unit 110 or stored in the memory 160 in a call signal reception mode, a call mode, a record mode, a voice recognition mode, or a broadcast reception mode. The audio output module 152 may provide audible outputs related to a particular function performed by the mobile terminal 100 such as a call signal reception sound, and a message reception sound. The audio output module 152 may include a speaker, a buzzer, or other sound generating device.

The alarm unit 153 may inform about the occurrence of an event in the mobile terminal 100. Typical events may include call reception, message reception, key signal inputs, and a touch input. In addition to audio or video outputs, the alarm unit 153 may output in a different manner to inform about the occurrence of an event. For example, the alarm unit 153 may provide an output in the form of vibrations. A video signal or an audio signal may be output also via the display unit 151 or the voice output module 152.

The haptic module 154 generates various haptic effects the user may feel. A typical example of the haptic effects generated by the haptic module 154 is vibration. The strength and pattern of vibration generated by the haptic module 154 may be controlled. For example, different vibrations may be combined to be output or sequentially output.

The haptic module 154 may generate various haptic effects such as an effect by stimulation according to an arrangement of pins vertically moving with respect to a contact skin, an effect by stimulation through a jetting force or suction force through a jetting orifice or a suction orifice, an effect by stimulation made on the skin, an effect by stimulation through a contact of an electrode, an effect by stimulation using electrostatic force, or an effect of thermal sensation reproduction using a device that can absorb or generate heat.

The haptic module 154 may be configured to not only transfer a haptic effect through a direct contact but also to allow feeling of a haptic effect through a muscle sense such as the user's fingers or arms. In an exemplary embodiment, two or more haptic modules 154 may be provided.

The memory 160 may store programs used for the processing and controlling operations performed by the controller 180, or may temporarily store data (e.g., a phonebook, messages, still images, or video) that have been input or which are to be output. In addition, the memory 160 may store data regarding various patterns of vibrations and audio signals to be output when a touch is applied to the touch screen.

The memory 160 may include at least one type of storage medium including a Flash memory, a hard disk, a multimedia card, a card-type memory (e.g., SD or DX memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, or an optical disk. The mobile terminal 100 may cooperate with a network storage device that performs the storage function of the memory 160 over a network connection.

The interface unit 170 may be used as a communication link (or passage, path). The interface unit 170 allows receiving data or power from an external device and transferring the received data power to each element in the mobile terminal 100 or transmit this data from the mobile terminal 100 to the external device. For example, the interface unit 170 may include a wired/wireless headset port, an external recharger port, a wired/wireless data port, a memory card port, a portion connecting a device having an identification module, an audio I/O (input/output) port, a video I/O port, or an earphone port.

The identification module is a chip storing various information for authenticating a usage authority of the mobile terminal 100, and may include a user identity module (UIM), a subscriber identity module (SIM), or a universal subscriber identity module (USIM). A device having such an identification module (referred to as an 'identification unit', hereinafter) may be configured as a smart card. Thus, the identification unit may be connected with the terminal via a port.

When the mobile terminal 100 is connected with an external cradle, the interface unit 170 may serve as a passage through which power is supplied to the mobile terminal 100 from the cradle, or as a passage through which various command signals input from the cradle by the user is transferred to the mobile terminal. Various command signals input from the cradle and power may operate as signals for recognizing when the mobile terminal 100 has been mounted properly on the cradle.

The controller 180 (e.g., a microprocessor) typically controls the general operations of the mobile terminal 100. For example, the controller 180 performs control and processing associated with voice calls, data communications, and video calls. In addition, the controller 180 may include a multimedia module 181 for reproducing or playing back multimedia data. The multimedia module 181 may be configured within the controller 180 or may be configured as separate from the controller 180. The controller 180 may perform pattern recognition processing to recognize a handwriting input or a picture drawing input performed on the touch screen as characters or images.

The power supply unit 190 receives external power via a power cable connection or internal power via a battery of the mobile terminal 100 and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

FIG. 2 is a front perspective view of the mobile terminal 100 according to an embodiment of the present invention. The mobile terminal 100 includes a bar-type terminal body, but is not limited thereto. The present invention can be applicable to various other mobile terminal 100 structures such as a slide type, folder-type, swing-type, or a swivel type.

The body includes a case (or casing, housing, cover). The case includes a front case 101 and a rear case 102. Various electronic components are installed in the space between the front case 101 and the rear case 102. One or more intermediate cases may be additionally disposed between the front case 101 and the rear case 102. The cases may be formed by injection-molding a synthetic resin or may be made of a metallic material such as stainless steel (STS) or titanium (Ti).

The display unit 151, the audio output module 152, the camera 121, first and second user input units 131 and 132, the microphone 122, and the interface unit 170 may be located on the front case 101.

The display unit 151 occupies most of the circumferential surface of the front case 101. The audio output module 151 and the camera 121 are disposed at a region adjacent to one end of the display unit 151, and the first user input unit 131 and the microphone 122 are disposed at a region adjacent to the other end of the display unit. The user input unit 132 and the interface unit 170 are disposed at the sides of the front case 101 and the rear case 102.

The first and second user input units 131 and 132 may be generally referred to as the user input unit 130, and various methods and techniques can be employed for the user input unit so long as they can be operated by the user in a tactile manner. Content input through the first or second user input unit 131 and 132 may be set variably. For example, the first user input unit 131 may receive commands such as "start," "end," or "scroll," and the second user input unit 132 may receive commands for adjusting the sound volume output from the audio output module 152, or changing (setting/releasing a touch lock function) the display unit 151 into a touch recognition mode.

Figure 2A:
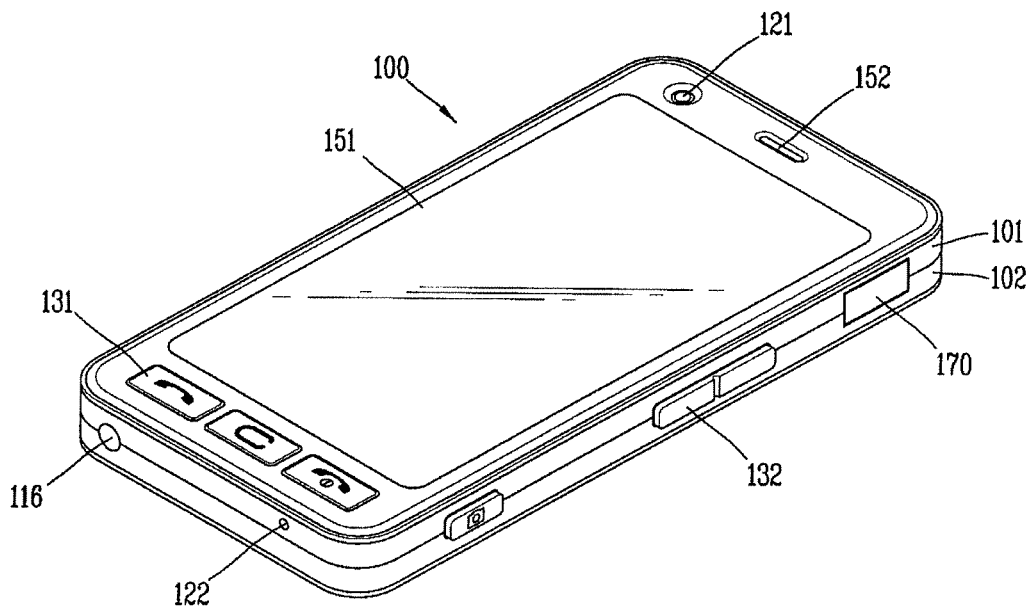
FIG. 2A is a front perspective view of the mobile terminal according to one embodiment of the present invention.
Figure 2B:
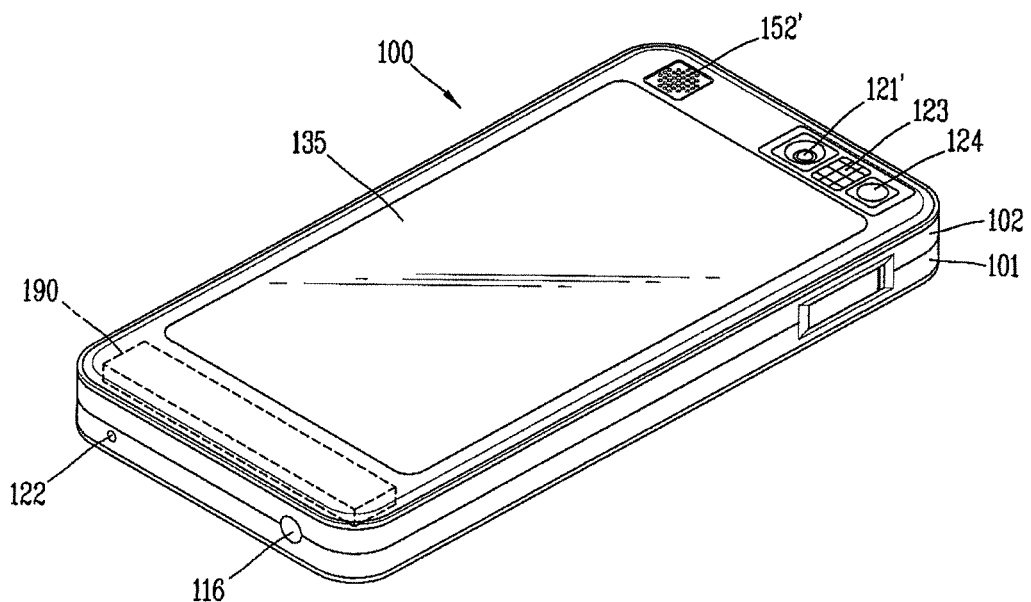
FIG. 2B is a rear perspective view of the mobile terminal according to one embodiment of the present invention.

FIG. 2B is a rear perspective view of the mobile terminal 100 shown in FIG. 2A. With reference to FIG. 2B, a camera 121' may be additionally mounted at the rear surface of the terminal body, namely, at the rear case 102. The camera 121' may have an image capture direction which is substantially opposite to the image capture direction of the camera 121 of the first body 101 (i.e., the two cameras may be implemented to face towards opposing directions, such as front and rear), and may support a different number of pixels (i.e., have a different resolution) than the camera 121.

For example, the camera 121 may operate with a relatively lower resolution to capture an image(s) of the user's face and immediately transmit such image(s) to another party in real-time during video call communication. The camera 121' may operate with a relatively higher resolution to capture images of general objects with high picture quality, which may not require immediate transmission in real time. The cameras 121 and 121' may be installed on the terminal body such that they can be rotated or popped up.

A flash 123 and a mirror 124 may be additionally disposed adjacent to the camera 121'. When an image of the subject is captured with the camera 121', the flash 123 illuminates the subject. The mirror 124 allows the user to see himself when he wants to capture his own image (i.e., self-image capturing) by using the camera 121'.

An audio output unit 152' may be additionally disposed on the rear surface of the terminal body. The audio output unit 152' may support stereophonic sound functions in conjunction with the audio output unit 152 and may be also used for implementing a speaker phone mode during call communication.

A broadcast signal receiving antenna 116 may be additionally disposed at one side or region of the terminal body, in addition to an antenna that is used for mobile communications. The antenna 116 can also be configured to be retractable from the terminal body.

The power supply unit 190 for supplying power to the mobile terminal 100 is mounted at the terminal body. The power supply unit 190 may be installed in the terminal body or may be detachably attached to the terminal body.

A touch pad 135 for detecting a touch may be additionally mounted on the rear case 102. The touch pad 135 may be also configured as a light transmissive touch pad. In this case, if the display unit 151 is configured to output visual information from both sides, the visual information may be recognized also via the touch pad 135. The information output from the both sides of the display unit 151 may be controlled by the touch pad 135. Alternatively, a display may be additionally mounted on the touch pad 135 and a touch screen may be disposed on the rear case 102.

The touch pad 135 is operated in association with the display unit 151 of the front case 101. The touch pad 135 may be disposed to be parallel to the display unit 151 at the rear side of the display unit. The touch pad 135 may have the same size as the display unit 151 or may be smaller.

Figure 3A:
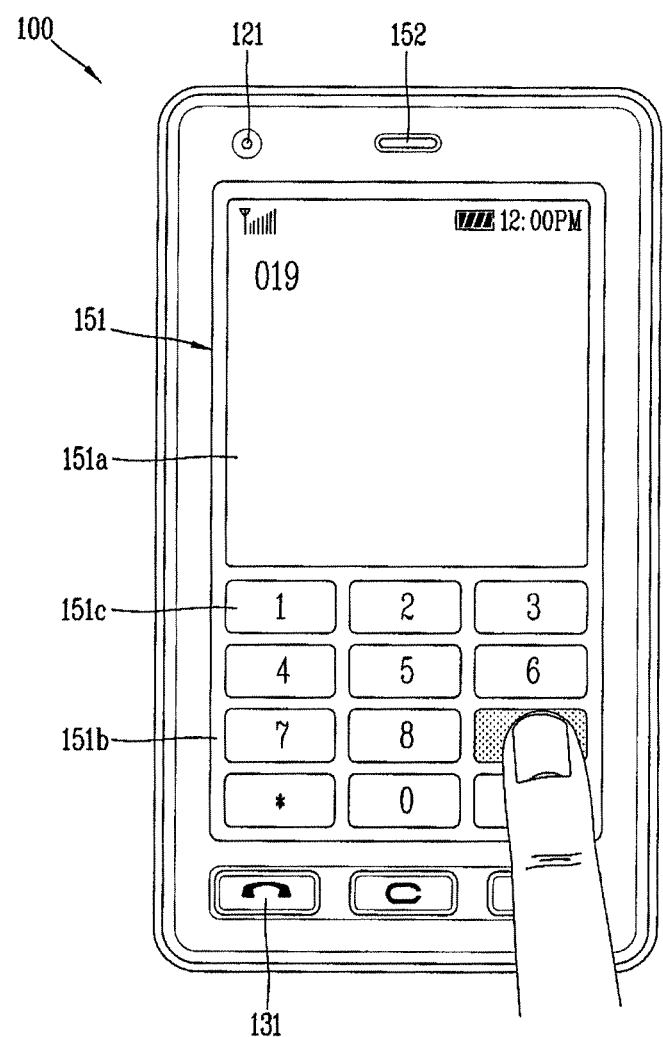
FIG. 3A and FIG. 3B are front views of the mobile terminal for illustrating operational states of the mobile terminal according to an embodiment of the present invention.
Figure 3B:
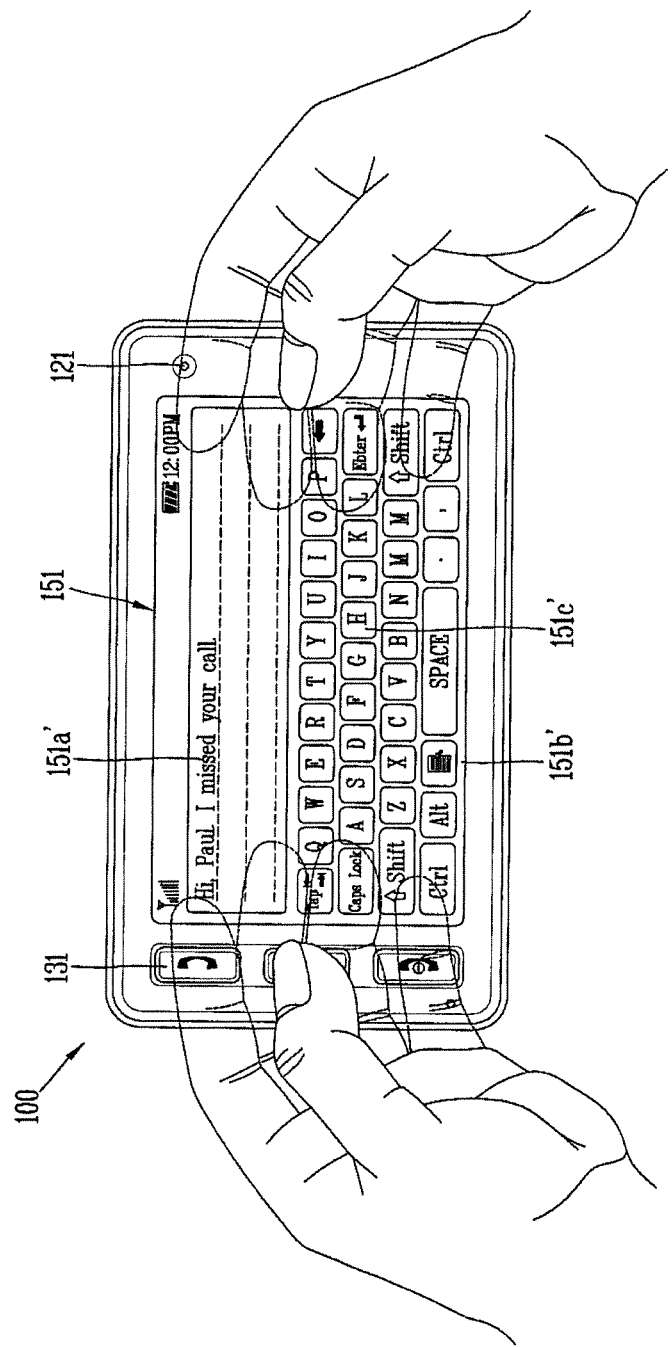

The operation of the display unit 151 and the touch pad 135 will now be described with reference to FIG. 3A and FIG. 3B. FIG. 3A and FIG. 3B are front views of the mobile terminal 100 for illustrating operational states of the mobile terminal according to an exemplary embodiment of the present invention.

Various types of visual information may be displayed on the display unit 151. Such information may be displayed in the form of characters, numbers, symbols, graphic images, or icons. In order to input such information, at least one of the characters, numbers, symbols, graphic images and icons may be displayed in a certain array so as to be implemented in the form of a keypad.

FIG. 3A illustrates receiving a touch applied to an icon in the display unit 151 on a front surface of the terminal body. The display unit 151 may be operated as a whole region or may be divided into a plurality of regions and accordingly operated. In the latter case, the plurality of regions may be operated in association with each other.

For example, an output window 151a and an input window 151b may be displayed at upper and lower portions of the display unit 151, respectively. Icons 151c including numbers for inputting, for example, a phone number are output from the input window 151b.

When an icon 151c is touched, a number corresponding to the touched icon is displayed on the output window 151a. When a call key (send key) of the first user input unit 131 is manipulated, a call connection with respect to a phone number displayed on the output window 151a is attempted.

FIG. 3B illustrates receiving a touch applied to an icon in the display unit 151 on the rear surface of the terminal body. FIG. 3A illustrates the terminal body disposed vertically. FIG. 3B illustrates the terminal body disposed horizontally. The display unit 151 may be configured to convert an output screen image according to the disposition direction of the terminal body.

FIG. 3B illustrates an operation of a text input mode in the mobile terminal 100. The output window 151a' and an input window 151b' are displayed on the display unit 151. A plurality of icons 151c' including at least characters, symbols, and/or numbers may be arranged on the input window 151b'. The icons 151c' may be arranged in the form of qwerty keys.

When the icons 151c' are touched through the touch pad 135, characters, numbers, or symbols, corresponding to the touched icons are displayed on the output window 151a'. Compared with a touch input through the display unit 151, a touch input through the touch pad 135 can advantageously prevent the icons 151c from being covered by a user's fingers. When the display unit 151 and the touch pad 135 are transparent, a user's fingers on the rear surface of the terminal body can be viewed by the user, and therefore the touch input can be more accurately performed.

In addition to the input methods presented in the above-described embodiments, the display unit 151 or the touch pad 135 may be configured to receive a touch through scrolling. The user may move a cursor or a pointer positioned on an entity, such as an icon, displayed on the display unit 151, by scrolling the display unit 151 or the touch pad 135. In addition, when the user moves his fingers on the display unit 151 or the touch pad 135, the path along which the user's fingers move may be visually displayed on the display unit. Such functionality would be useful in editing an image displayed on the display unit 151.

One function of the mobile terminal 100 may be executed when both the display unit 151 (touch screen) and the touch pad 135 are touched together within a certain time range. The duel touch may be clamping the terminal body with the user's thumb and index finger. The function may be, for example, activation or deactivation of the display unit 151 or the touch pad 135.

Figure 4:
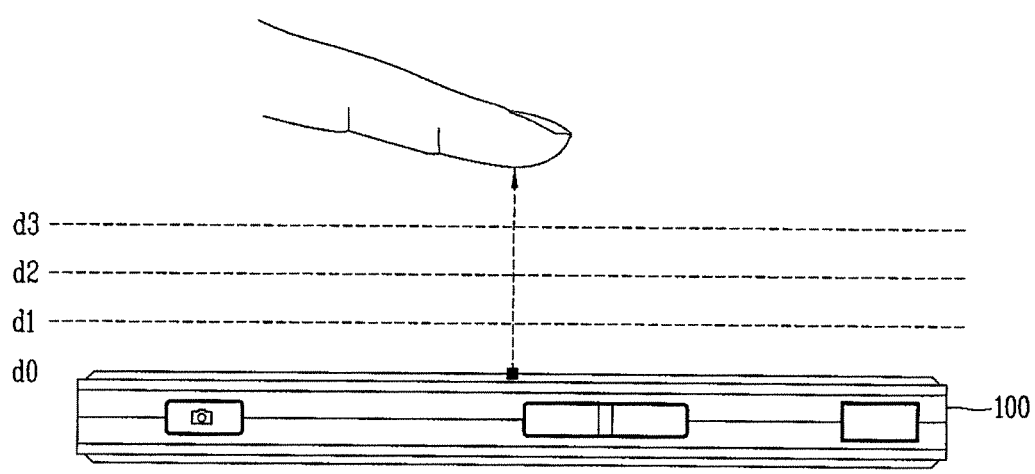
FIG. 4 is a conceptual view for illustrating a proximity depth of a proximity sensor.

The proximity sensor 141 will now be described in detail with reference to FIG. 4. FIG. 4 is a conceptual view for illustrating the depth of proximity of the proximity sensor.

As shown in FIG. 4, when a pointer such as the user's finger closes to the touch screen, the proximity sensor 141 disposed within or near the touch screen detects the user's finger and outputs a proximity signal.

The proximity sensor 141 may be configured to output a different proximity signal according to the distance (referred to as a 'proximity depth', hereinafter) between the closely touched pointer and the touch screen. The distance according to which the proximity signal is output when the pointer approaches the touch screen is called a detection distance. In this respect, a plurality of proximity sensors each having a different detection distance may be used to output respective proximity signals. By comparing the respective proximity signals, the proximity depth can be obtained.

FIG. 4 shows a touch screen with proximity sensors for detecting three proximity depths. Alternatively, the proximity sensors may detect more or less proximity depths.

When the pointer is brought into full contact with the touch screen D0, it is recognized as a contact touch. When the pointer is positioned to be spaced apart by a distance D1 on the touch screen, it is recognized as a proximity touch with a first proximity depth. If the pointer is positioned to be spaced apart by the distance greater than the distance D1 but less than a distance D2 on the touch screen, it is recognized as a proximity touch with the a second proximity depth. If the pointer is positioned to be spaced apart by the distance greater than the distance D2 but less than a distance D3, it is recognized as a proximity touch with a third proximity depth. If the pointer is positioned to be spaced apart by a distance greater than the distance D3 on the touch screen, it is recognized that the proximity touch has been released. Accordingly, the controller 180 may recognize the proximity touches as various input signals based on the proximity distances or proximity positions according to how close the pointer is on the touch screen.

Figure 5:
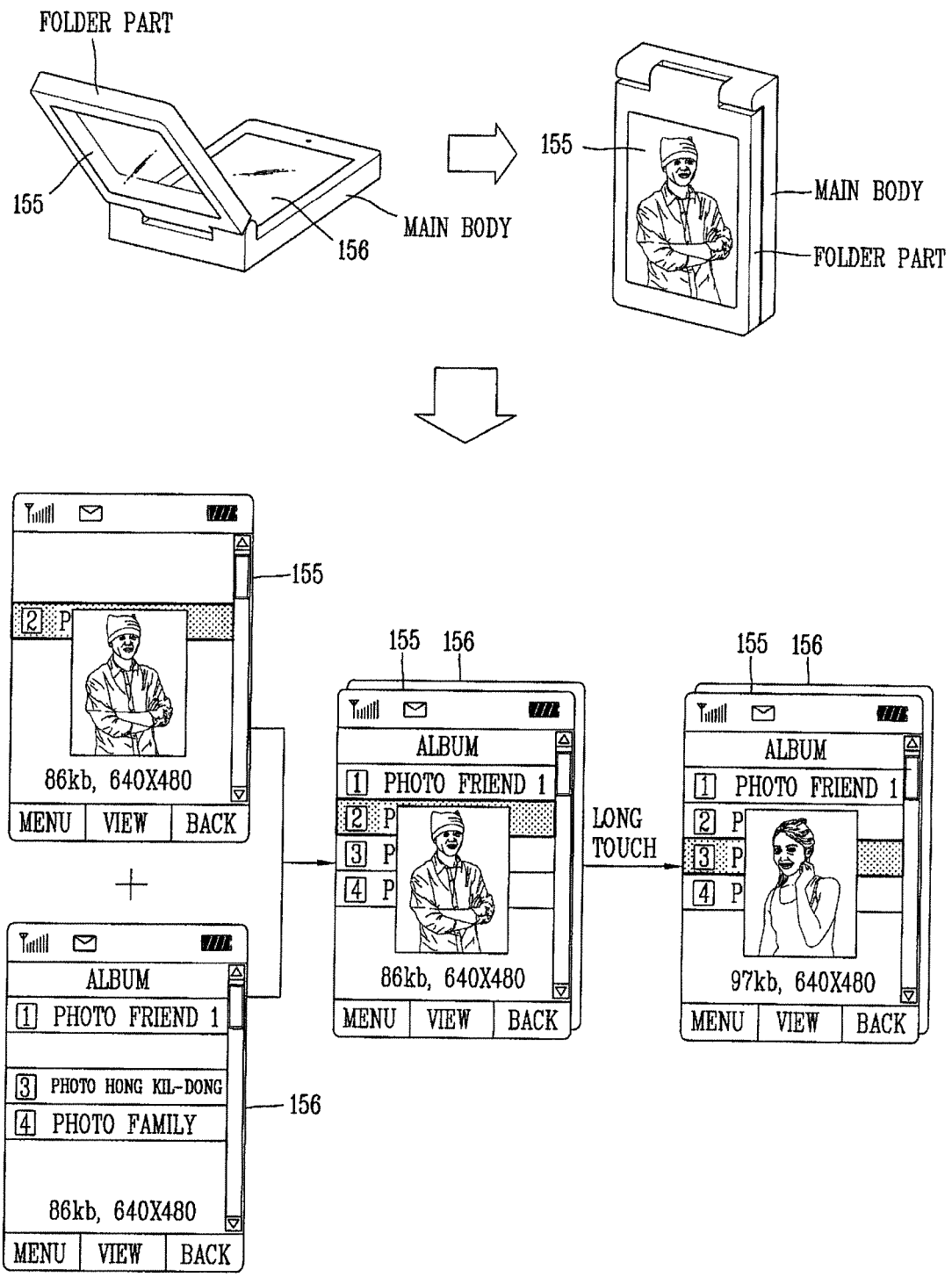
FIG. 5 is a conceptual view for illustrating a method for controlling a touch operation in a configuration such that a pair of display units overlap with each other.

FIG. 5 is a conceptual view for illustrating a method for controlling a touch operation in a configuration that a pair of display units overlap with each other. The mobile terminal 100 shown in FIG. 5 is a folder type terminal in which a folder part 201 is foldably connected with the main body 202. A first display unit 155 mounted on the folder part 201 may be translucent or transparent, such as a TOLED, while a second display unit 156 mounted on the main body 202 may not allow light transmission, such as an LCD. The first and second display units 155 and 156 may be configured as a touch screen through which a touch can be applied.

For example, when a touch (contact touch or a proximity touch) with the TOLED is detected, the controller 180 may provide control to select or to run at least one image on an image list displayed on the TOLED 155 according to a type of the touch or a touch duration.

Hereinafter, a method for controlling information displayed on a different display unit or on the LCD 156 when a touch is applied to the TOLED 155 exposed in an overlaid configuration will be described based on input methods discriminated by a touch, a long touch, and a long touch & dragging.

In the overlaid configuration (i.e., the mobile terminal 100 is in a closed configuration), the TOLED 155 is overlaid on the LCD 156. In this configuration, if a touch, such as a long touch continued for more than two or three seconds, which is different from the touch for controlling the image displayed on the TOLED 155, is detected, the controller 180 provides control to select at least one image on the image list displayed on the LCD 156 according to the detected touch input. The result according to execution of the selected image is displayed on the TOLED 155.

The long touch may be used to selectively move a desired one of the entities displayed on the LCD 156 to the TOLED 155 without executing a corresponding operation. For example, when the user makes a long touch on one region of the TOLED 155 corresponding to a particular entity of the LCD 156, the controller 180 provides control to move the corresponding entity to the TOLED 155 and to display the entity on the TOLED 155.

An entity displayed on the TOLED 155 may also be moved to the LCD 156 according to a certain touch input to the TOLED 155. FIG. 5 depicts the menu No. 2, displayed on the LCD 156, being moved for display on the TOLED 155.

When a drag is detected together with a long touch, the controller may provide control to display, for example, a preview screen image of a selected image according to a function related to the image selected by the long touch on the TOLED 155. FIG. 5 depicts an example in which an image file of a preview photo image of a man from menu No. 2 has been displayed.

When a preview screen image is output and dragging is additionally made on the TOLED 155 while the long touch is maintained, the controller moves a select cursor or a select bar of the LCD 156 and displays an image selected by the select cursor on a preview screen, such as a photo image of a woman. Thereafter, when the touch (long touch and dragging) ends, the controller 180 displays the first image selected by the long touch.

The touch operation such as a long touch and dragging can be applied in the same manner as a sliding operation such as an operation of a proximity touch corresponding to the dragging together with a long proximity touch such as a proximity touch continued for more than at least two to three seconds.

When a touch operation other than the above-described operation is detected, the controller 180 may perform an operation in the same manner as the general touch control method.

A control method for a touch operation applied to overlapping displays may also be applied to a mobile terminal 100 having a single display. In addition, the control method can be also applicable to a folder type mobile terminal 100 having a dual-display and other mobile terminals.

Figure 6A:
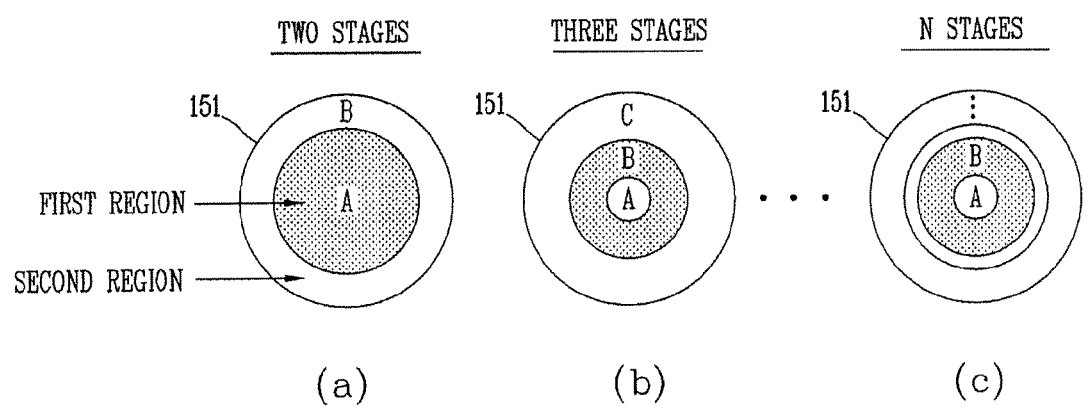
FIG. 6A and FIG. 6B are conceptual views for illustrating a proximity region from which a proximity signal is detected and a haptic region from which a haptic effect is generated.
Figure 6B:
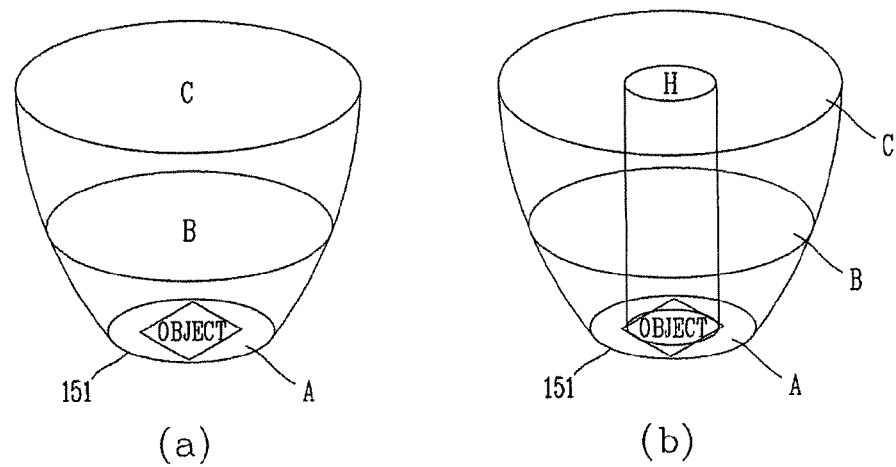

FIG. 6A and FIG. 6B are conceptual views for illustrating a proximity region from which a proximity signal is detected and a haptic region from which a haptic effect is generated. FIG. 6A shows a circular object such as an icon or a menu item, but the object shape is not thus limited. The region of the display unit 151 on which the object is displayed may be divided into a first central region (A) and a second region (B) that surrounds the first region (A).

The first and second regions A and B may be configured to generate a haptic effect with a different strength and pattern. For example, the first and second regions A and B may be configured by two stages such that when the second region (B) is touched, a first vibration is generated, and when the first region (A) is touched, a second vibration stronger than the first vibration is generated.

When both a proximity region and a haptic region are desired to be set at the region where the object is displayed, the haptic region from which a haptic effect is generated and the proximity region from which a proximity signal is detected can be set to have different sizes. The haptic region may be set to be narrower or larger than the proximity region. For example, in FIG. 6A (a), the region including the first region (A) and the second region (B) may be set as the proximity region while the first region (A) may be set as the haptic region.

As shown in FIG. 6A (b), the region where the object is displayed may be divided into three regions A, B, and C, or as shown in FIG. 6A (c), may be divided into N number of regions. Each divided region may be configured to generate a haptic effect with a different strength or pattern. When the region where a single object is displayed is divided into three or more regions, the haptic region and the proximity region may be set to be different according to a usage environment.

The proximity region may be configured such that its size is varied according to a distance from the display unit 151. As shown in FIG. 6B (a), a corresponding proximity region is configured to be smaller as the distance to the display unit 151 decreases. Conversely, a corresponding proximity region may be configured to be larger as a distance to the display unit 151 increases. Furthermore, the haptic region may be set to have a certain fixed size regardless of a distance to the display unit 151, such as the H region shown in FIG. 6B (b).

When the region where the object is displayed is divided into haptic regions and/or proximity regions, the regions may be divided into concentric circular regions, or regions split in a horizontal direction, a vertical direction, a radial direction, or any such combination.

A method for controlling music play in a mobile terminal 100 according to an exemplary embodiment of the present invention will now be described. The mobile terminal 100 may include a player/multimedia module 181 for playing (reproducing) multimedia such as music or video.

When the player is executed, the multimedia module 181 configures a music skin, such as a playing screen of the player, as album art. The music skin refers to an image displayed on the screen of the player when contents previously stored in the memory 160 or contents downloaded via the wireless communication unit 110 are reproduced. The album art is an album image such as an album jacket, album photo, or album cover included in album information related to contents of a music file.

When the music file is played (reproduced) by using the multimedia module 181, the controller 180 checks whether there is album art related to the currently played song. If there is album art, the album art is configured as a music skin of the player and is displayed. If there is no album art, a default image is configured as a music skin of the player and displayed or information related to the song may be displayed. The song related information such as track information and album information may include the title of the song, an artist, the title of an album, a type, or a size/length of the song.

The controller 180 displays a progress bar indicating the progress of the song together with the album art. The progress bar indicates a lapsed time and a remaining time of the currently played song, and a play header of the progress bar is moved according to the duration of the music play time. The play header may be manipulated to change a play position.

The sensing unit 140 detects a touch input on the album art displayed on the screen of the player. The controller 180 controls an operation of the player such as playing, pausing, and searching music based on a form or point of the detected touch input. The form of touch input may be a proximity and contact touch or a proximity and contact dragging.

Figure 7:
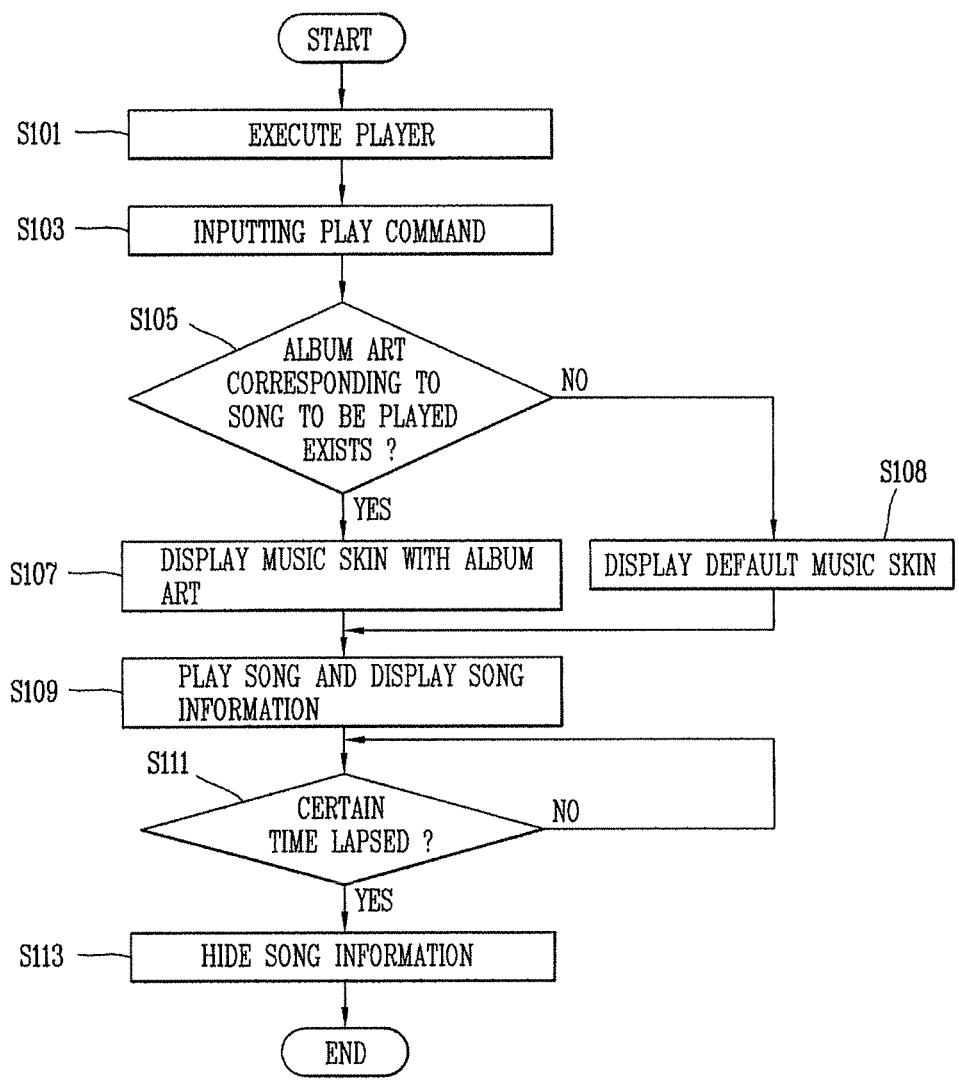
FIG. 7 is a flow chart illustrating a method for controlling music play of the mobile terminal according to one embodiment of the present invention.

FIG. 7 is a flow chart illustrating a method for controlling music play of a mobile terminal 100 according to one embodiment of the present invention. First, when a player function is selected according to manipulation of a menu by the user, the controller 180 executes the player (S101). The controller 180 drives the multimedia module 181 and displays a player execution screen image on the display unit 151.

When a play (reproduction) command is input by the user on the displayed execution screen image of the player (S103), the controller 180 checks whether there is album art corresponding to the song to be played (S105). Specifically, when the play command is input following the selection of the song to be played on the player execution screen image displayed on the display unit 151, the controller 180 checks whether there is album art related to the selected song and/or album.

If there is album art, the controller 180 configures the corresponding album art as a music skin of the player and displays the album art (S107). Specifically, the controller 180 displays the album art on the player screen.

The controller 180 plays the song via the multimedia module 181 and displays information related to the song being played (S109). The controller 180 displays information related to the played song such that it is overlaid on the album art displayed on the player screen. In addition, the controller may display the progress bar indicating the progress of the played song.

Thereafter, after a certain time, such as after two to three seconds lapses (S111), the controller 180 removes/hides the song information displayed on the player screen and the progress bar (S113). In other words, after a certain time lapses, the controller conceals the song information and the progress bar displayed on the screen of the display unit 151.

When there is no album art corresponding to the song to be played, the controller configures a default image as a music screen of the player (S108). In addition, the controller 180 may display information such as text information of the song to be played.

Figure 8:
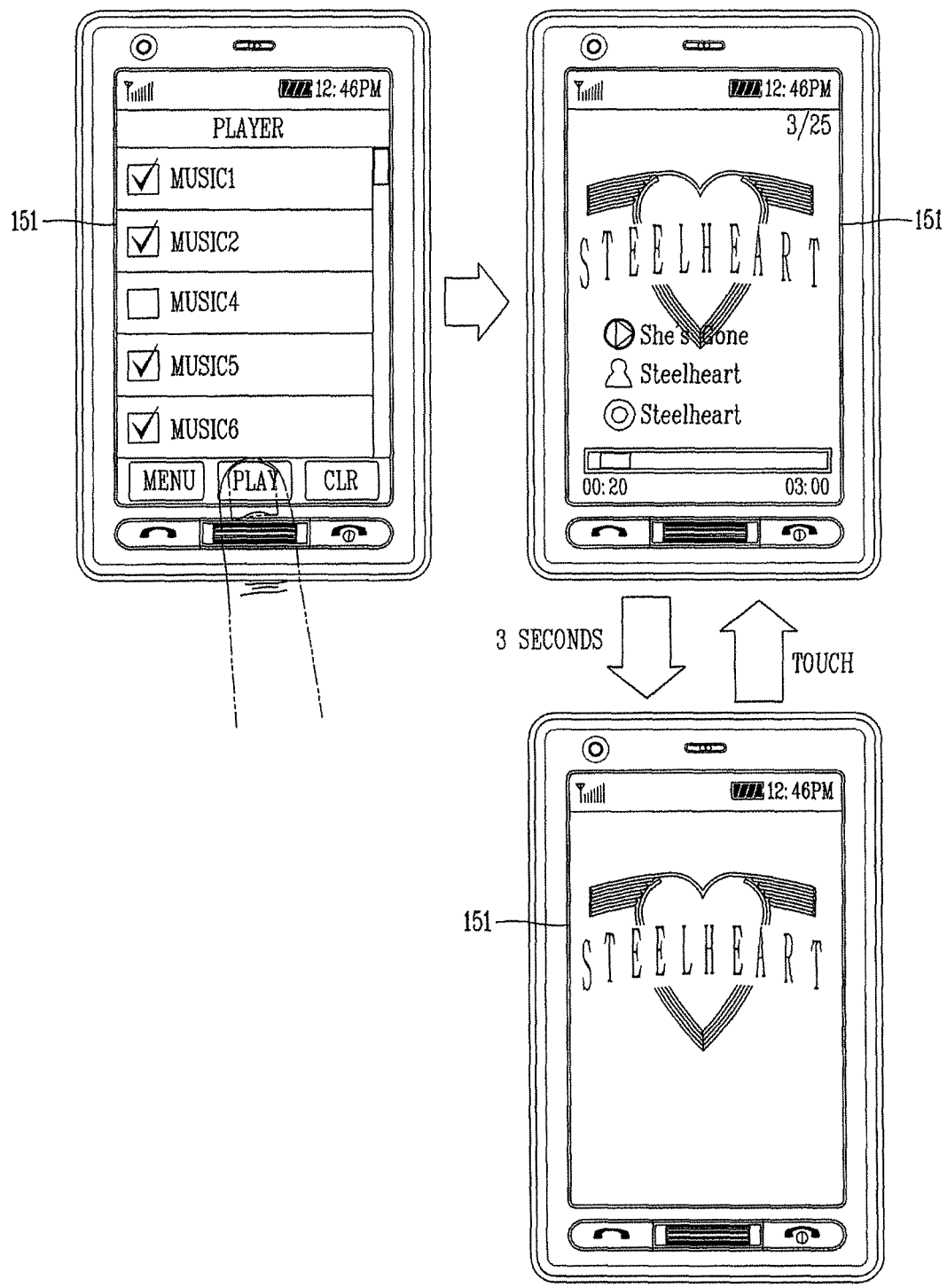
FIG. 8 depicts display screens illustrating the playing of music contents in the mobile terminal in FIG. 7 according to one embodiment of the present invention.

FIG. 8 depicts display screens illustrating the playing of music contents according to the method of FIG. 7 according to one embodiment of the present invention. First, when the player function for reproducing contents is selected according to manipulation of the menu by the user, the controller executes the player and displays a player execution screen image on the display unit 151. The controller 180 displays a stored music list or song list on the player execution screen image. The user may select a song(s) to be played from the displayed list of the songs or release a selection of a song which is not desired to be played.

When the user's finger touches the play button icon, the controller 180 plays the selected songs in order. The play order of the selected songs may be set by the user or determined according to a previously stored rule.

The controller 180 checks whether there is album art corresponding to the currently played song. If there is corresponding album art, the controller 180 displays the album art on the player screen. The controller may display song information and a progress bar such that they are overlaid on the album art displayed on the player screen.

Thereafter, after a certain time (e.g., three seconds) lapses, the controller conceals the song information (song title, artist, album) and the progress bar is displayed overlaid on the album art. Specifically, when the certain time (e.g., three seconds) has lapsed from the point of time of playing of the song, the controller 180 displays only the album art without the information and the progress bar related to the played song.

When the user's finger touches the player screen displaying only the album art, the sensing unit 140 detects the touch and informs the controller 180 accordingly. Then, the controller 180 resumes displaying of the song information and the progress bar.

Figure 9:
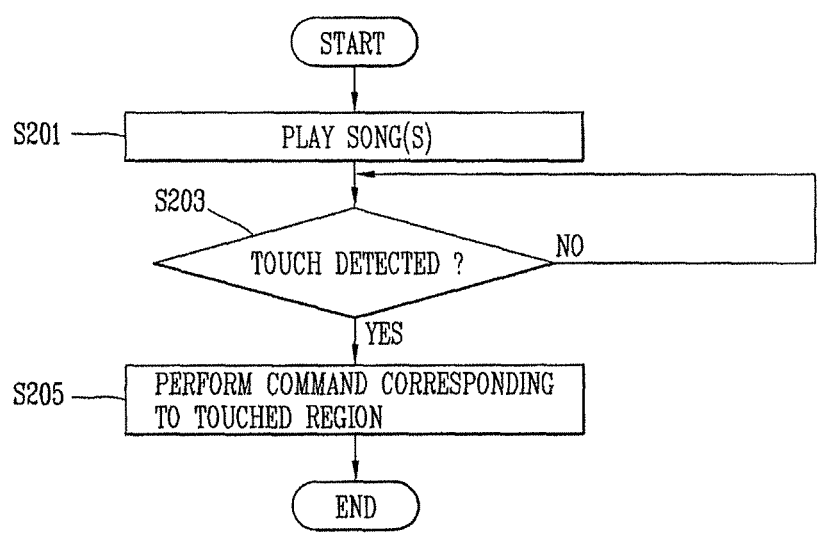
FIG. 9 is a flow chart illustrating a method for controlling music play of the mobile terminal according to another embodiment of the present invention.

FIG. 9 is a flow chart illustrating a method for controlling music play of a mobile terminal 100 according to another embodiment of the present invention in which the operation of the player is controlled while a song is being played. The controller 180 executes the player according to a user input and sequentially plays songs included in a play list (S201). The controller 180 uses album art related to the currently played song as a music skin of the player. The controller 180 displays the album art of the currently played song on the player screen.

When a pointer touches on a certain region of the player screen, the controller detects the touch via the sensing unit 140 (S203). The controller 180 performs a command corresponding to the touch-detected region (S205). For example, when a touch applied to the center of the album art displayed on the display unit 151 is detected, the controller 180 stops or pauses playing of the current song. If a touch on the screen of the display unit 151 displaying the album art is not detected, the controller maintains the playing operation.

Figure 10A:
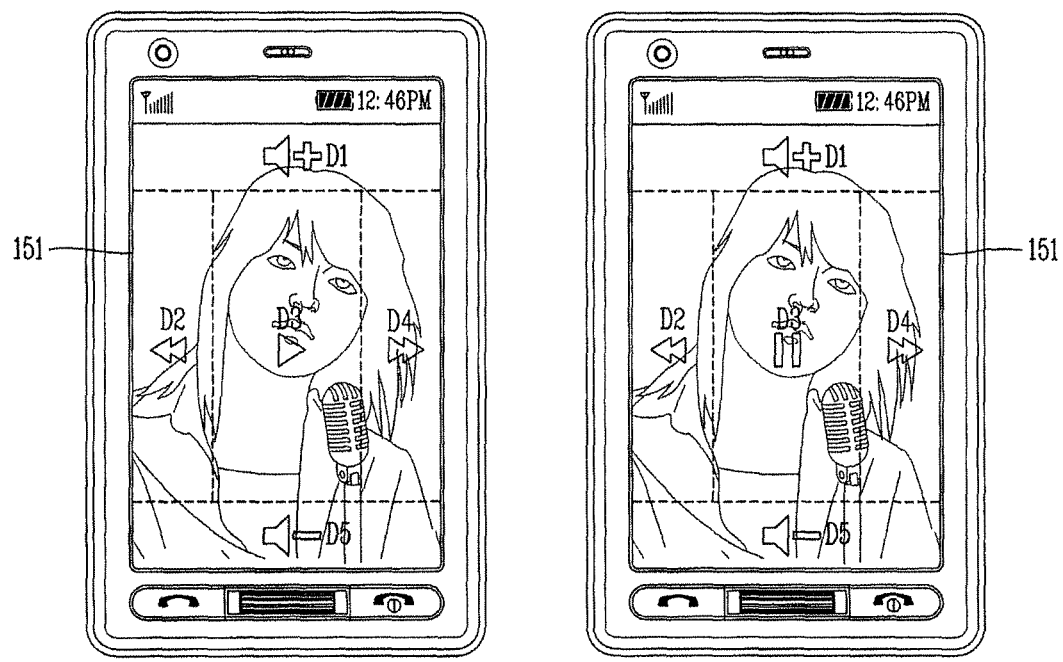
FIG. 10A and FIG. 10B depict display screens illustrating the controlling of music play in the method in FIG. 9.
Figure 10B:
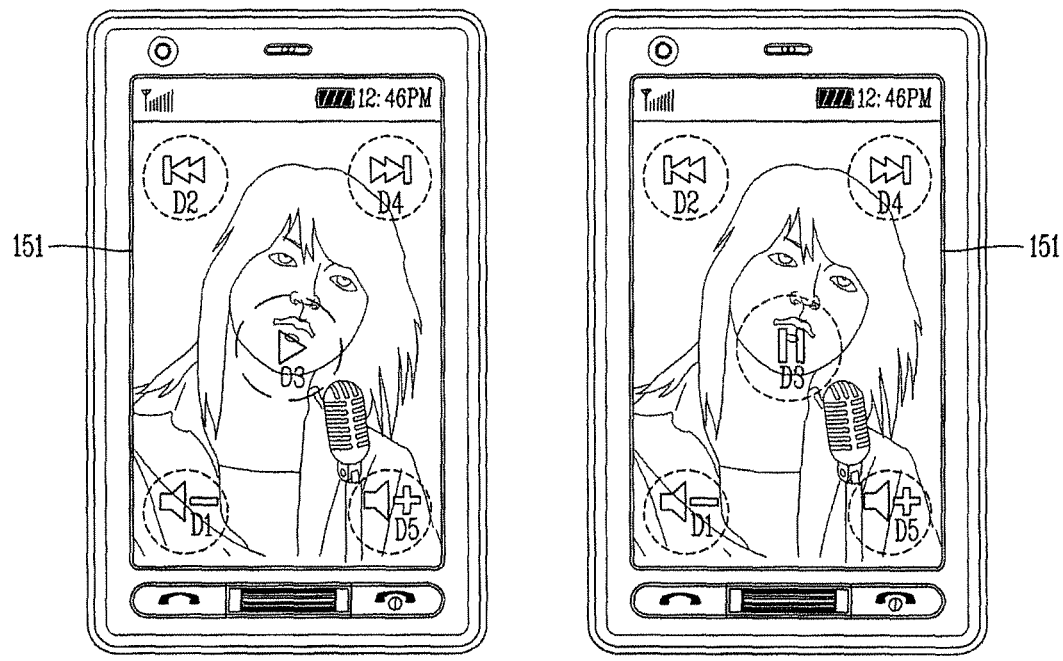

FIG. 10A and FIG. 10B depict display screens illustrating the controlling of music play according to the method of FIG. 9 according to one embodiment of the present invention. As illustrated, the screen of the display unit 151 is divided into five regions although the user cannot recognize it visually. When a touch input applied to one of the five regions is detected, the controller 180 performs a particular operation corresponding to the region.

With reference to FIG. 10A, if a touch input applied to a third region (D3) is detected, the controller 180 stops playing the song currently being played. If a touch input applied to a second region (D2) is detected, the controller 180 plays the previous song. If a touch input applied to a fourth region (D4) is detected, the controller plays the next song.

When touch inputs applied to the first and fifth region D1 and D5 are detected, the controller 180 may adjust the volume of an audio signal which is outputted via the audio output module 152 after being reproduced by the multimedia module 181.

With reference to FIG. 10B, each command corresponding to each of the five regions of the screen of the display unit 151 may be allocated. The divided regions and each command allocated to each region may be displayed such that the user can visually recognize them. Alternatively, when the pointer approaches the screen of the display unit 151 by more than a certain distance, the controller may display a command corresponding to the position to which the pointer is close.

Figure 11:
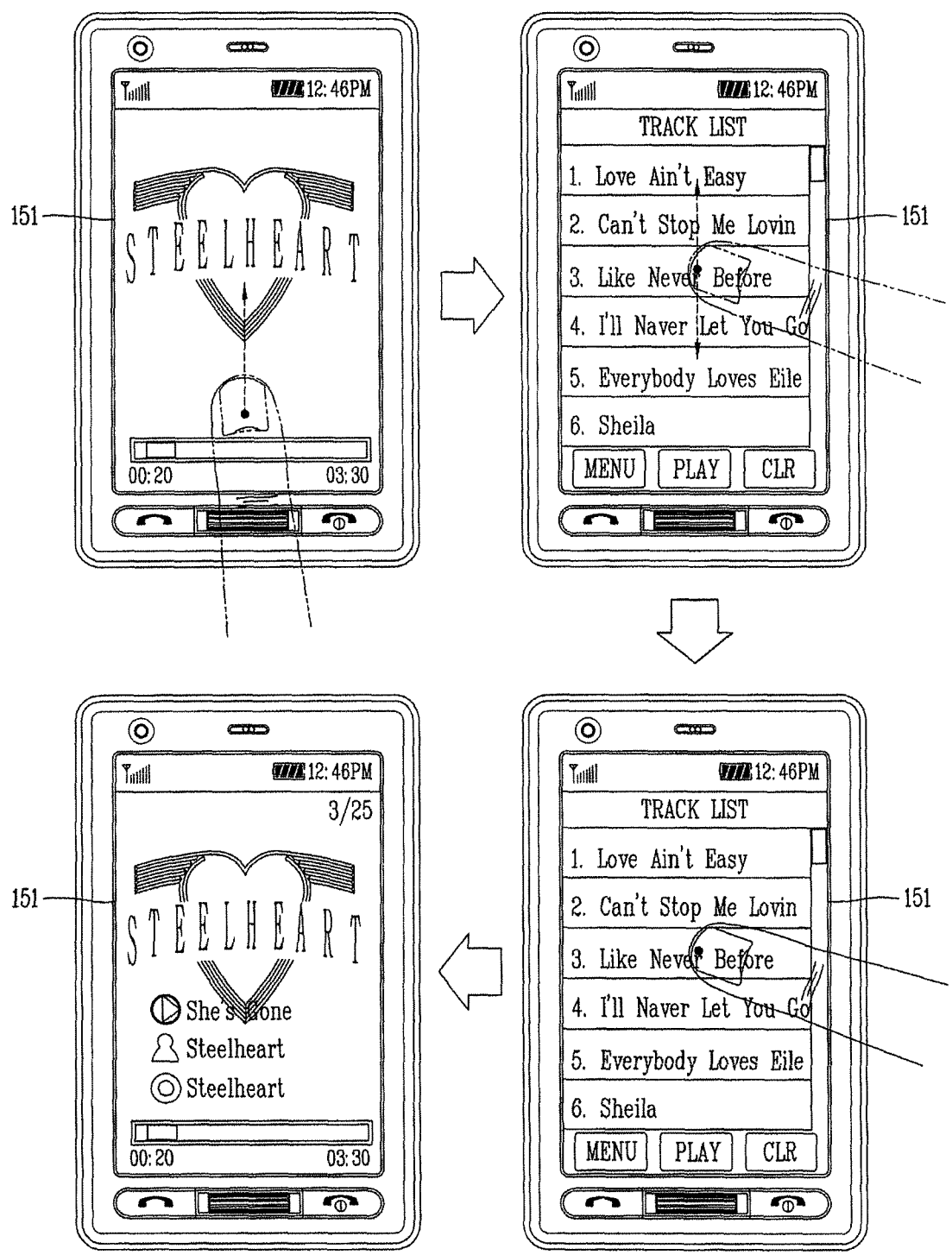
FIG. 11 depicts display screens illustrating the controlling of music play in the mobile terminal according to yet another embodiment of the present invention.

FIG. 11 depicts display screens illustrating the controlling of music play in the mobile terminal 100 according to yet another embodiment of the present invention. First, the controller 180 displays album art related to a song currently played on the display screen 151. If a pointer is touch-and-dragged on the displayed album, the sensing unit 140 detects the touch-and-drag. The controller 180 displays a song list or track list of the album including the currently played song on the display unit 151 based on the detected touch-and-drag. In this case, the controller 180 maintains playing of the current song.

For example, if a touch of the pointer applied to one point on the display screen on which the album art is displayed is detected and then the pointer is moved to a different point while the touch is maintained, the controller 180 detects the touch input via the sensing unit 140 and performs an 'album track list view', a command corresponding to the detected touch input. Specifically, the controller 180 displays a track list of the album being currently played on the display unit 151.

A song desired to be played can be searched or browsed through a touch input such as an up/down touch and dragging and flicking of the pointer on the screen displaying the track list. When a song desired to be played is selected through the searching of songs, the controller 180 plays the corresponding song. The controller 180 displays information related to the selected song for a certain time period from the play point of time of the selected song on the display unit 151.

Figure 12:
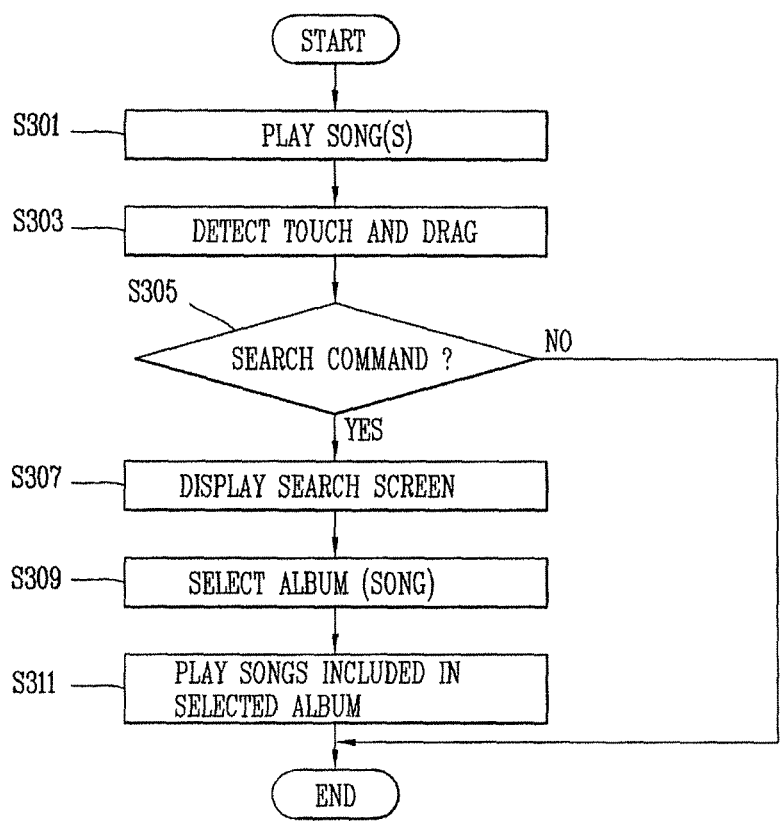
FIG. 12 is a flow chart illustrating a method for controlling music play of the mobile terminal according to yet another embodiment of the present invention.

FIG. 12 is a flow chart illustrating a method for controlling music play of a mobile terminal 100 according to yet another embodiment of the present invention. The controller 180 executes the player according to a user input and sequentially reproduces songs included in a play list (S301). The controller 180 displays album art corresponding to the currently played song as a music skin of the player.

When a touch-and-drag of the pointer on the displayed album art is detected (S303), the controller 180 checks whether a command corresponding to the detected touch and drag is a song search command (S305). If the detected touch and drag is a search command, the controller 180 also displays a search screen image (S307). That is, the controller also displays album art related to the search besides the album art of the currently played song. In other words, the controller 180 displays an album art list (cover flow) to allow searching of a desired album. When a particular album desired by the user is selected from the search screen displaying the album list (S309), the controller 180 plays the songs included in the corresponding album sequentially or randomly (S311).

Figure 13A:
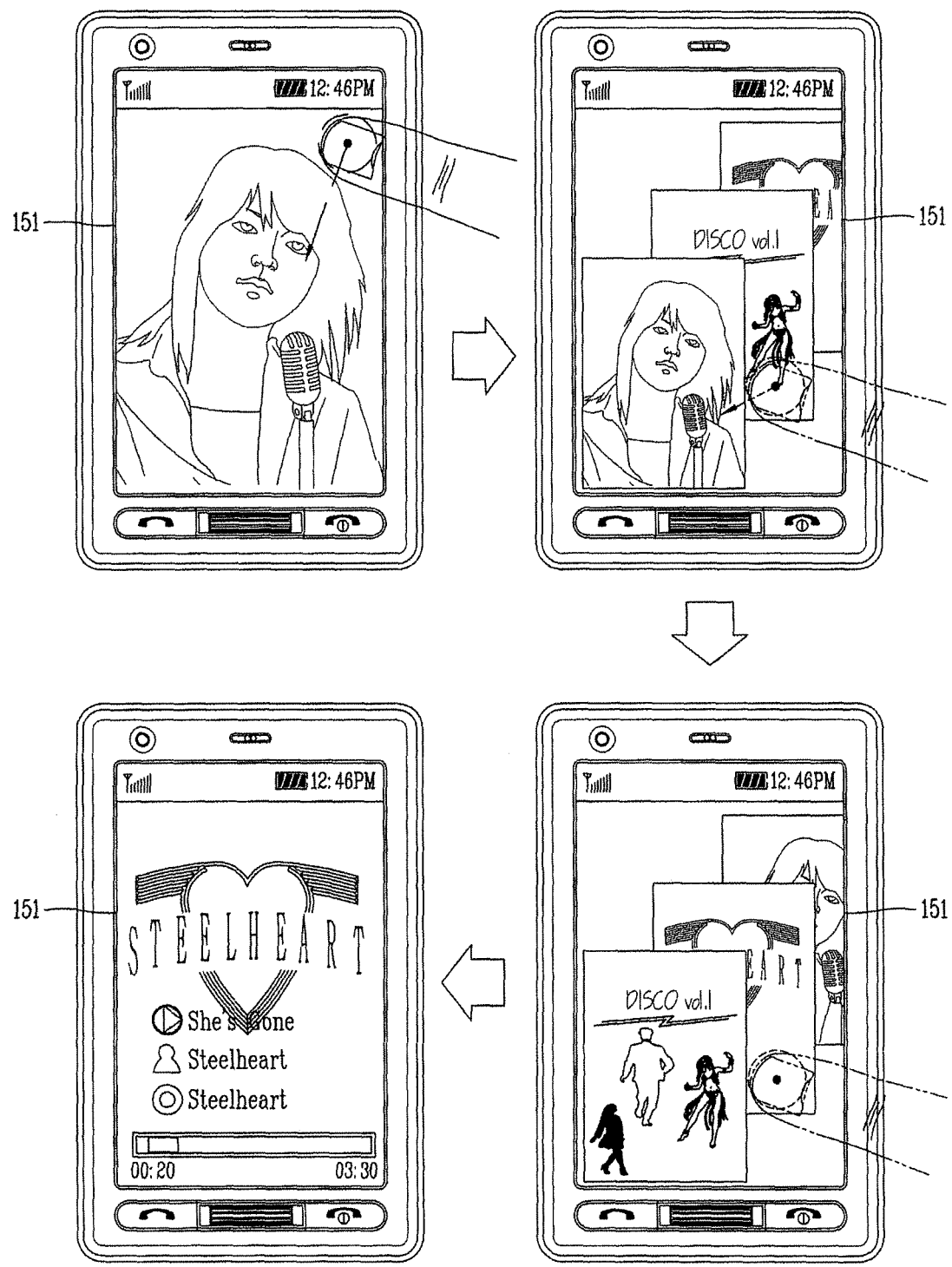
FIG. 13A and FIG. 13B depict display screens illustrating one example of controlling music play in the mobile terminal according to the embodiment of FIG. 12.
Figure 13B:
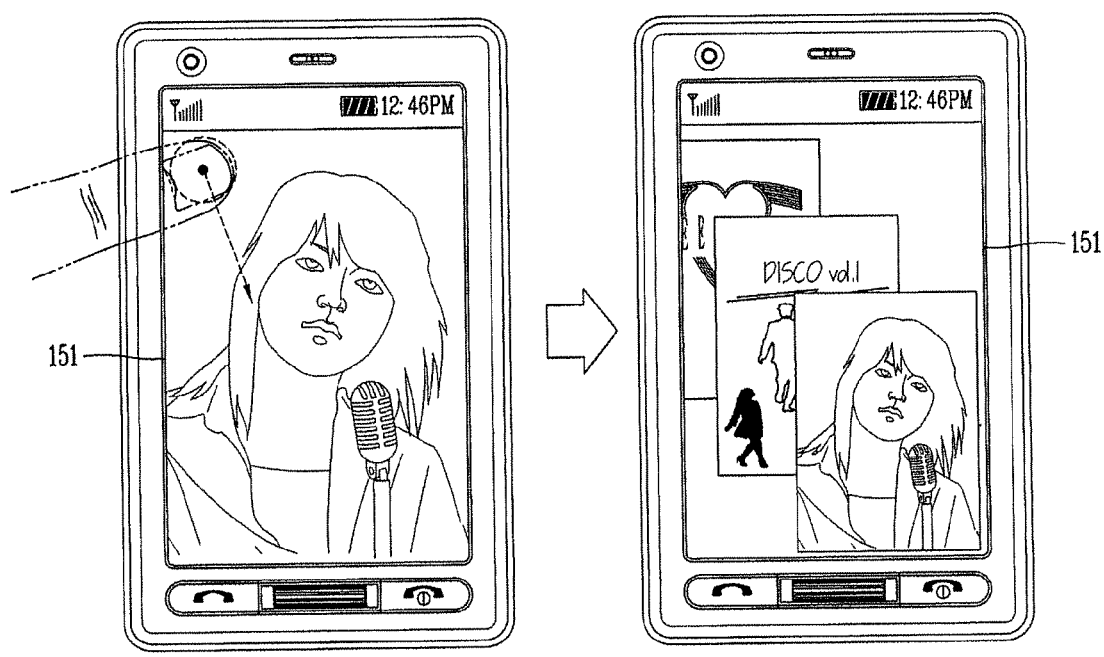

FIG. 13A and FIG. 13B depict display screens illustrating one example of controlling music play in the mobile terminal according to the method of FIG. 12. With reference to FIG. 13A, the controller 180 displays album art of a song being played through the multimedia module 181 on the display unit 151.

When the pointer touches on a particular region of the displayed album art, the sensing unit 140 detects the touch. The controller 180 checks whether a command corresponding to the touch input detected by the sensing unit 140 is a search command.

If the touch input is a search command, the controller 180 displays the search screen image. For example, if a touch and drag from a right upper end to a left lower end in the album art displayed on the display unit 151 is detected, the controller 180 displays an album list to be played next based on the currently played album.

When a drag and flick is input on the search screen, the controller 180 moves the album art in the direction of the drag and flick. For example, when dragging is made from left to right, the controller moves the displayed album art from left to right. The number of album art graphics displayed on the screen may be maintained to be the same.

When a particular album is selected from the search screen, the controller 180 plays songs included in the corresponding album according to the play order. The play order may include a random order or a sequential order. The controller 180 displays information about the currently played song at the play start for a certain time period.

With reference to FIG. 13B, the sensing unit 140 detects a touch of the pointer. When the pointer is moved while the touch is being maintained, the controller 180 performs an operation according to the movement direction.

For example, if the pointer touches a left upper end of the album art displayed on the display unit 151 and then is moved (dragged) to a right lower end of the album art while the touch is being maintained, the controller 180 detects the dragging via the sensing unit 140. The controller 180 performs a searching operation corresponding to the drag input. That is, the controller 180 displays a search screen image for searching an album and a song on the display unit. In addition, the controller sequentially displays a previous album art in the left direction based on the album art of the currently played song based on the drag direction. Thereafter, the user may select a desired album and song through a dragging and flicking operation on the screen displaying the album list.

Figure 14:
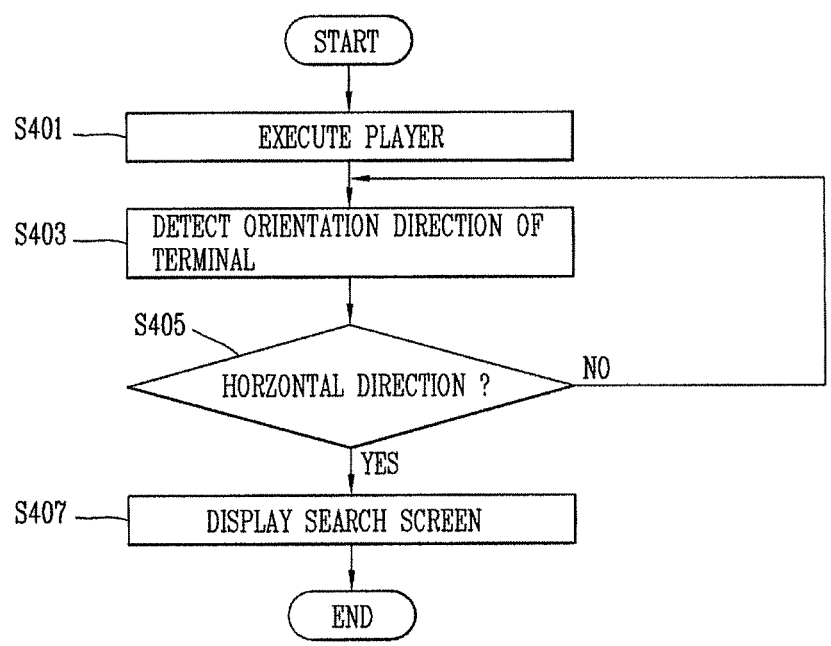
FIG. 14 is a flow chart illustrating a method for controlling music play of the mobile terminal according to another embodiment of the present invention.

FIG. 14 is a flow chart illustrating a method for controlling music play of a mobile terminal 100 according to another embodiment of the present invention. First, the controller 180 executes the player according to a user input and plays pre-set songs according to a certain order (S401). The controller 180 displays album art of the currently played song on the display unit 151.

When the orientation direction of the terminal is detected by the sensing unit 140 while the song is being played (S403), the controller 180 checks whether the orientation direction of the terminal is a horizontal direction (landscape) (S405). If the orientation direction of the terminal is a horizontal direction, the controller 180 displays a search screen for searching a song or album on the display screen (S407). Thereafter, when a song desired to be played is selected from the displayed search screen, the controller 180 plays the corresponding song. In addition, the controller 180 displays album art of the played song.

Figure 15:
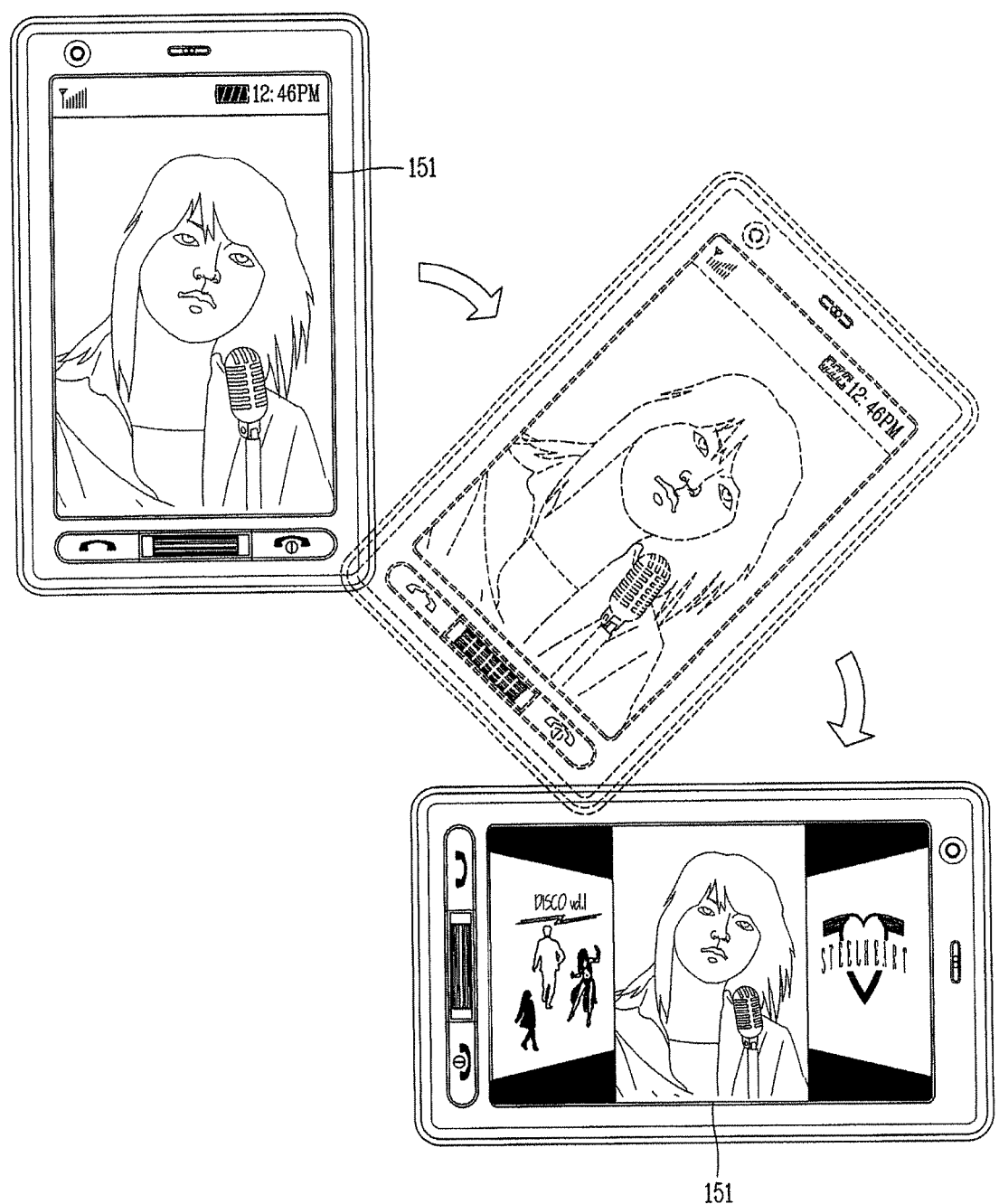
FIG. 15 depicts display screens illustrating the control of music play in the mobile terminal according to the method in FIG. 14.

FIG. 15 depicts display screens illustrating the controlling of music play according to the method in FIG. 14. With reference to FIG. 15, when an orientation direction of the terminal is a vertical direction (portrait), the controller 180 displays only album art of a currently played song on the screen of the display unit 151.

Thereafter, when tilting of the terminal is detected by the sensing unit 140, the controller 180 checks the orientation direction of the terminal according to the tilting of the terminal. If the orientation direction of the terminal is changed from the vertical direction to the horizontal direction, the controller 180 displays a search screen image for allowing searching of songs on the display screen. On the search screen, the album art of the currently played song is displayed in the center, album art of a previous album is displayed titled in one direction to the left of the center album art, and album art of the next album is displayed tilted in another direction to the right of the center album art. The display of the album art list on the search screen is not limited to the form as shown in FIG. 15, but may be modified variably.

Figure 16:
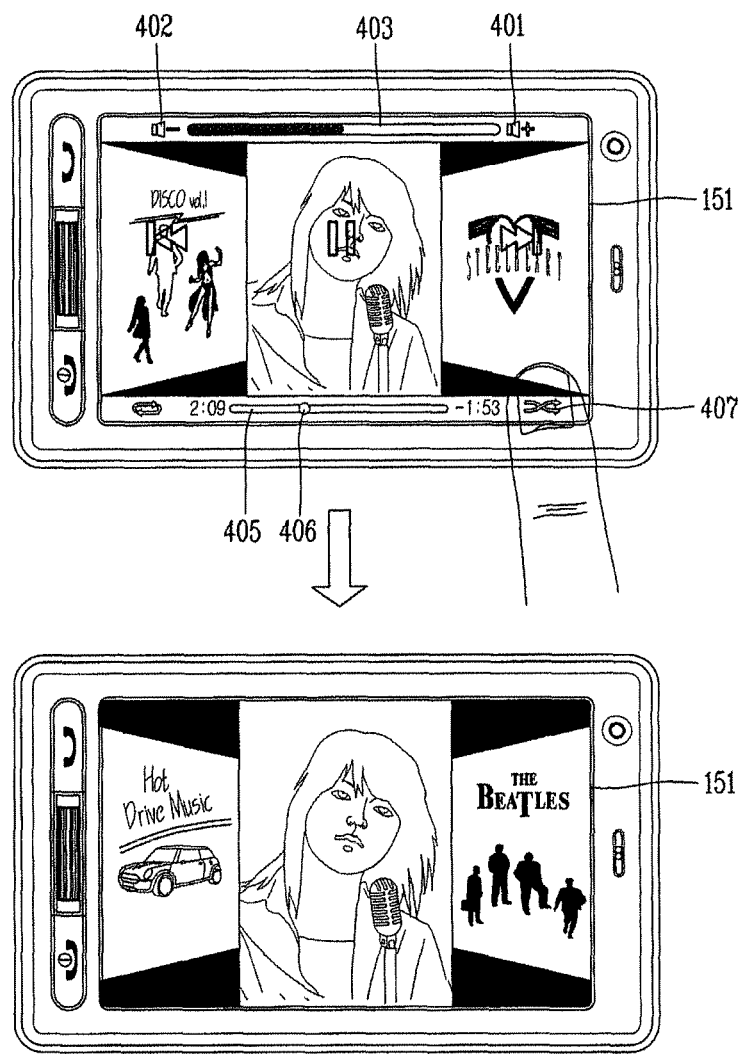
FIG. 16 depicts display screens illustrating the control of displaying album art according to controlling of music play in the mobile terminal according to one embodiment of the present invention.

FIG. 16 depicts display screens illustrating the controlling of displaying album art according to controlling of music play in the mobile terminal 100 according to one embodiment of the present invention. First, the controller 180 drives the multimedia module 181 according to a user input and sequentially plays songs registered on a play list. In addition, the controller 180 displays album art of the currently played song on the display unit 151. The controller 180 may display album art of a previous and/or next song according to the play order.

When the pointer approaches the album art displayed on the display unit 151, the proximity sensor 141 of the sensing unit 140 detects the approach and informs the controller 180 accordingly. As the approach of the pointer is detected, the controller 180 displays a control icon for controlling the player such that it is overlaid on the album art.

The control icon may include a play icon, a pause icon, a previous icon, a next icon, a rewind icon, a fast-forward icon, a volume icon, or a play mode (sequential, random, repetitive) icon. The volume icon may be implemented as volume up and down icons 401 and 402 or as a volume slider 403. In addition, the volume icon may be implemented in the form of combination of the two types of icons.

The controller 180 may display a progress bar 405 indicating a song play state. A play header 406 of the progress bar 405 may be manipulated or moved to change the song play position. The play header 406 may be moved in one direction as the song play progresses.

When the play mode icon displayed on the album art is changed, the controller 180 re-aligns the song play order according to the changed play mode, and also re-aligns album art displayed on the display unit 151 accordingly. For example, when the play mode is changed from sequential play to random play (shuffle) while a song is being played, the controller 180 changes the play order of songs while maintaining playing of the current song. When a touch of the pointer to an arbitrary play setting/releasing icon 407 among the control icons displayed on the album art is detected, the controller 180 detects the touch via the sensing unit 140 and changes the play order of the songs according to setting of the arbitrary playing. The controller 180 then re-aligns the album art according to the changed play order and displays the album art. That is, the controller 180 changes album art of a next song and displays the album art of the previous, current, and next songs.

Figure 17:
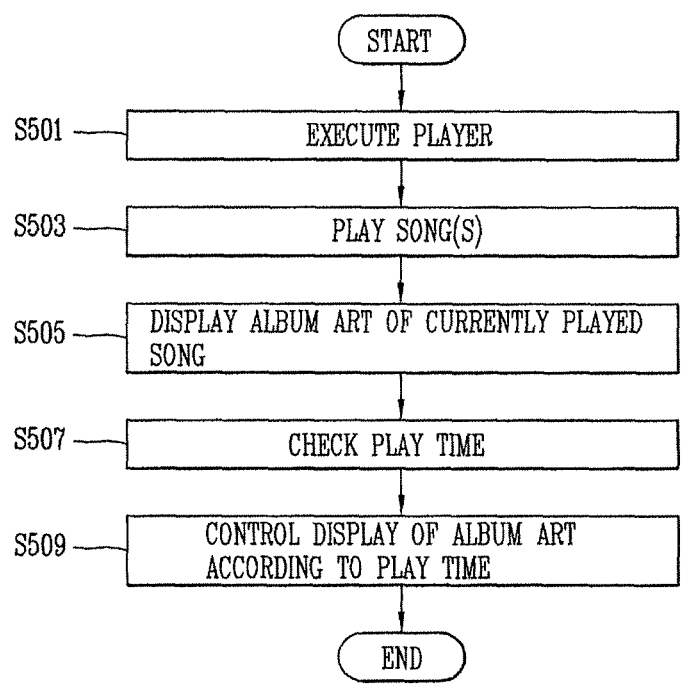
FIG. 17 is a flow chart illustrating a method for controlling music play of the mobile terminal according to another embodiment of the present invention.

FIG. 17 is a flow chart illustrating a method for controlling music play of the mobile terminal according to another embodiment of the present invention. First, the controller 180 executes the player according to manipulation of menu by the user (S501). The controller 180 drives the multimedia module 181 for playing the music contents according to the user input and displays a player execution screen image on the display screen.

When a song desired to be played is selected from the player execution screen image and then a play command is input, the controller 180 plays selected songs according to a certain order (S503). The controller 180 displays album art of the played song on the display screen (S505). The controller 180 may also display the progress bar indicating a play time.

Subsequently, the controller checks the play time of the currently played song (S507). The controller 180 executes a counter at the point of time at which the song play starts, and when playing of the song is completed, the controller 180 resets the counter.

When the play time of the song is checked, the controller controls displaying of the progress bar and may control the displayed album art according to the checked play time (S509). That is, the controller 180 changes the progress bar with the lapse of the play time of the song and may additionally change the album art displayed. Accordingly, the controller 180 may display album art of the next song before the next song is played.

Figure 18:
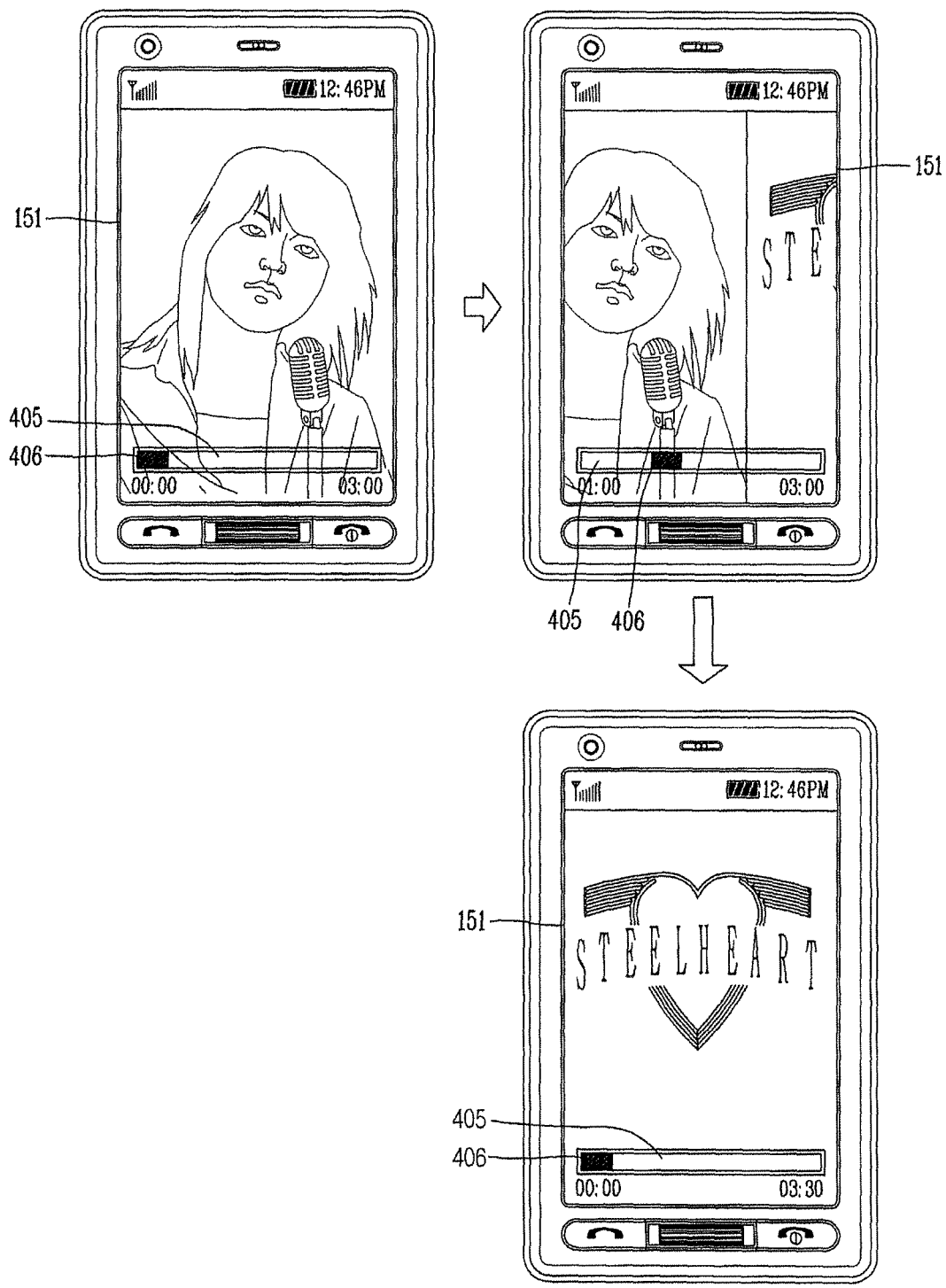
FIG. 18 is a flow chart illustrating the controlling of music play in the mobile terminal according to the method in FIG. 17.

FIG. 18 is a flow chart illustrating the controlling of music play in the mobile terminal according to the method of FIG. 17. As illustrated, when playing a song in the player, the controller 180 displays album art of the currently played song on the screen of the display unit. The controller 180 may also display the progress bar 405 indicating a play time of the song.

As the song plays, the controller moves the album art in one direction on the screen. For example, the controller 180 moves the album art of the currently played song from right to left with the lapse of the play time. The controller 180 displays the album art of the currently played song on the entire screen of the display unit 151 at the time point at which the song starts to be played.

When one-third of the song is played, the controller 180 moves one-third of the album art corresponding to the currently played song so as to disappear from the screen and fills the remaining screen region with album art of the next song. The controller 180 may display the progress bar 405 indicating the lapse of the play time of the song together with the album art. The controller 180 moves the play head 406 of the progress bar 405 according to the lapse of the play time of the song.

When playing of the current song is completed, the controller 180 plays the next song, displays album art of the corresponding song on the entire screen of the display unit 151, and then, as the song play time lapses, the controller 180 moves the album art for display.

The song play position can be changed by manipulating the album art or the progress bar 405 displayed on the screen of the display unit according to a dragging operation. For example, when two-thirds of the album art of the currently played song displayed on the entire screen of the display unit 151 is moved to the left, the controller 180 starts play of the current song starting from the point two-thirds into the play of the song. Alternatively, when the play header 406 of the progress bar 405 is moved, the controller 180 detects the change in the position of the play header 406 and plays the song by changing the play position of the song based on the changed position of the play header 405.

The mobile terminal according to at least one of the embodiments of the present invention constructed as described above can control music play based on a touch input. In addition, album art can be configured as a music player skin. Furthermore, displaying of album art can be controlled according to a music/song play time, and music play progress bar can be controlled according to the control of the album art.

In the exemplary embodiments of the present invention, the above-described method can be implemented as software codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, and an optical data storage device. The computer-readable medium also includes implementations in the form of carrier waves or signals (e.g., transmission via the Internet). The computer may include the controller 180 of the terminal.

The mobile terminal according to the exemplary embodiments of the present invention is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
   a touch screen configured for displaying information;
   a sensing unit configured for sensing a touch applied to the touch screen; and
   a controller configured for:
      controlling playing of songs;
      controlling the touch screen to display album art related to a currently played song and information related to the currently played song, wherein the information related to the currently played song is displayed overlaid on the album art related to the currently played song;
      controlling the touch screen to cease displaying the information related to the currently played song when the touch screen receives no input for a predetermined time measured from when the information is initially displayed; and
      controlling the touch screen to progressively replace the album art related to the currently played song with album art related to a next song to be played based on progress of the currently played song, wherein the displayed album art related to the next song and the displayed album art related to the currently played song do not overlap with each other on the touch screen and the portion of the album art related to the currently played song that is replaced is proportional to a ratio of a current playing position of the currently played song to a total playing time of the currently played song.

2. The mobile terminal of claim 1, wherein the controller is further configured for controlling the touch screen to move the album art related to the currently played song in response to a touch and drag input.

3. The mobile terminal of claim 2, wherein the controller is further configured for changing a play position of the currently played song based on the movement of the album art.

4. The mobile terminal of claim 3, wherein the controller is further configured for controlling the touch screen to:
   display a progress bar related to the currently played song; and
   display progress on the progress bar based on the movement of the album art.

5. The mobile terminal of claim 1, wherein the controller is further configured for controlling at least one of playing the currently played song, pausing the currently played song, searching for songs, playing a previous song, playing the next song to be played, rewinding the currently played song, or fast-forwarding the currently played song.

6. The mobile terminal of claim 1, wherein the controller is further configured for controlling the touch screen to realign and display album art related to a previous song and the album art related to the next song to be played adjacent to the album art related to the currently played song based on a playing order of the previous song, the currently played song and the next song to be played.

7. The mobile terminal of clam 1, wherein the controller is further configured for controlling the touch screen to realign and display album art based on a change in a play order.

8. A method for controlling playing of music by a mobile terminal, the method comprising:
   controlling playing a song via a controller of the mobile terminal;
   controlling, via the controller, a touch screen of the mobile terminal to display album art related to the played song and information related to the played song, wherein the information related to the played song is displayed overlaid on the album art related to the played song;

controlling the touch screen to cease displaying the information related to the played song when the touch screen receives no input for a predetermined time measured from when the information is initially displayed; and controlling the touch screen to progressively replace the album art related to the played song with album art related to a next song to be played based on progress of the played song, wherein the displayed album art related to the next song and the displayed album art related to the currently played song do not overlap with each other on the touch screen and the portion of the album art related to the currently played song that is replaced is proportional to a ratio of a current playing position of the currently played song to a total playing time of the currently played song.

9. The method of claim 8, further comprising:

detecting, via the controller, a touch input received on the displayed album art related to the played song, and performing a control command, via the controller, corresponding to a region on the displayed album art where the touch input was detected.

10. The method of claim 9, wherein the control command comprises playing a song, pausing a song, searching for songs, playing a previous song, playing the next song to be played, rewinding the played song, or fast-forwarding the played song.

11. The method of claim 8, further comprising:

detecting, via the controller, input on the album art related to the played song; and changing, via the controller, a play position of the played song based on the detected input on the album art.

12. The method of claim 8, further comprising controlling, via the controller, the touch screen to display album art related to a previous song and the album art related to the next song to be played adjacent to the album art related to the played song based on a playing order of the previous song, the played song and the next song to be played.

* * * * *